United States Patent
Virk et al.

(10) Patent No.: US 12,433,636 B2
(45) Date of Patent: Oct. 7, 2025

(54) SPINAL FUSION INSTRUMENTATION SYSTEM AND METHODS OF USING SAME

(71) Applicant: New York Society for the Relief of the Ruptured and Crippled, Maintaining the Hospital for Special Surgery, New York, NY (US)

(72) Inventors: Sohrab Virk, Dix Hills, NY (US); Harvinder Sandhu, Greenwich, CT (US); Sheeraz Qureshi, New York, NY (US)

(73) Assignee: New York Society for the Relief of the Ruptured and Crippled maintaining the Hospital for Special Surgery, New York, NY (US)

( * ) Notice: Subject to any disclaimer, the term of this patent is extended or adjusted under 35 U.S.C. 154(b) by 625 days.

(21) Appl. No.: 17/766,797

(22) PCT Filed: Oct. 29, 2020

(86) PCT No.: PCT/US2020/057984
§ 371 (c)(1),
(2) Date: Apr. 6, 2022

(87) PCT Pub. No.: WO2021/087126
PCT Pub. Date: May 6, 2021

(65) Prior Publication Data
US 2023/0346425 A1    Nov. 2, 2023

Related U.S. Application Data

(60) Provisional application No. 62/928,034, filed on Oct. 30, 2019.

(51) Int. Cl.
*A61B 17/34* (2006.01)
*A61B 17/17* (2006.01)
(Continued)

(52) U.S. Cl.
CPC ...... *A61B 17/3431* (2013.01); *A61B 17/1735* (2013.01); *A61B 17/3439* (2013.01);
(Continued)

(58) Field of Classification Search
CPC ............ A61B 17/8802; A61B 17/8811; A61B 17/8816; A61B 17/8825; A61B 17/8833;
(Continued)

(56) References Cited

U.S. PATENT DOCUMENTS 7,166,133 B2 * 1/2007 Evans .................. A61F 2/4601
  623/23.61
7,235,107 B2 * 6/2007 Evans ................ A61B 17/3468
  623/23.61
(Continued)

OTHER PUBLICATIONS

Li et al., "Surgical outcomes of mini-open Wiltse approach and conventional open approach in patients with single-segment thoracolumbar fractures without neurologic injury", The Journal of Biomedical Research, 2015, 29(1):76-82.
(Continued)

*Primary Examiner* — Anu Ramana
(74) *Attorney, Agent, or Firm* — Kim IP Law Group LLC

(57) ABSTRACT

A surgical instrument kit for spinal fusion. The instrument kit includes a curved trocar (10), a flexible cannula (30) for positioning over the curved trocar, a flexible rasp device (70), and a bone graft delivery container (90).

23 Claims, 17 Drawing Sheets

(51) Int. Cl.
*A61F 2/44* (2006.01)
*A61F 2/46* (2006.01)

(52) U.S. Cl.
CPC ............ *A61F 2/446* (2013.01); *A61F 2/4611* (2013.01); *A61F 2/4644* (2013.01); *A61B 2017/3454* (2013.01); *A61F 2002/4677* (2013.01)

(58) Field of Classification Search
CPC ............ A61B 17/3415; A61B 17/3417; A61B 17/3421; A61B 17/1659; A61B 17/1671
See application file for complete search history.

(56) References Cited

U.S. PATENT DOCUMENTS

| | | | | |
|---|---|---|---|---|
| 7,241,316 B2* | 7/2007 | Evans | .............. | A61B 17/32053 623/23.61 |
| 7,753,941 B2* | 7/2010 | Keith | ................ | A61B 17/1671 606/279 |
| 8,097,021 B1 | 1/2012 | Kornel | | |
| 8,246,627 B2* | 8/2012 | Vanleeuwen | ...... | A61B 17/1671 606/92 |
| 8,486,077 B1* | 7/2013 | Kornel | ............... | A61B 17/7074 606/279 |
| 9,320,535 B2* | 4/2016 | Zaretzka | ........ | A61B 17/320725 |
| 9,981,061 B2* | 5/2018 | Evans | ..................... | A61L 27/54 |
| 10,058,369 B2* | 8/2018 | O'Halloran | ......... | A61B 17/7094 |
| 10,143,560 B2* | 12/2018 | Pflum | ..................... | A61F 2/441 |
| 2005/0209610 A1* | 9/2005 | Carrison | .............. | A61B 17/221 606/114 |
| 2007/0010824 A1* | 1/2007 | Malandain | ......... | A61B 17/8822 606/92 |
| 2010/0076502 A1 | 3/2010 | Guyer et al. | | |
| 2012/0203290 A1 | 8/2012 | Warren et al. | | |
| 2013/0253591 A1 | 9/2013 | Kornel | | |
| 2014/0046245 A1 | 2/2014 | Cornacchia | | |
| 2019/0231388 A1 | 8/2019 | Robich | | |

OTHER PUBLICATIONS

Li et al., "Comparative study between mini-open TLIF via Wiltse's approach and conventional open TLIP in lumbar degenerative diseases", European Review for Medical and Pharmacological Sciences, 2018, 22 (1 Suppl): 53-62.

International Search Report and Written Opinion for International Application No. PCT/US2020/057984, dated March 5. 2021.

\* cited by examiner

SPINAL FUSION INSTRUMENTATION SYSTEM AND METHODS OF USING SAME

CROSS-REFERENCE TO RELATED APPLICATIONS

This application is a U.S. national phase application under 35 U.S.C. § 371 of International Application No. PCT/US2020/057984, filed on Oct. 29, 2020, which claims priority to U.S. Provisional Patent Application No. 62/928,034 filed on Oct. 30, 2019, the disclosures of each of which are hereby incorporated by reference in their entirety for all purposes.

The exemplary embodiments of present invention relate generally to a spinal fusion instruments and techniques and, more specifically, to a spinal fusion instrumentation system and methods of using a spinal fusion instrumentation system for performing a minimally invasive spinal fusion.

BACKGROUND OF THE DISCLOSURE

Traditional spinal fusions typically involve a large open dissection with pedicle screw fixation. This technique is associated with muscle damage, risk of infection, extended surgical times, long hospital stays and possible injury to sensitive neural elements. Recently, there has been an increasing emphasis in spinal surgery for muscle-sparing procedures that utilize sophisticated techniques/instruments to achieve the goals of surgery in a minimally invasive manner and assist with rapid recovery from surgery that addresses risks associated with traditional spinal fusions.

BRIEF SUMMARY OF THE DISCLOSURE

In accordance with an exemplary embodiment there is provided a surgical instrument kit comprising a curved trocar, a flexible cannula for positioning over the curved trocar, a flexible rasp device, and a bone graft delivery container.

According to an aspect, the curved trocar is used to penetrate the skin and pass between vertebral bony elements to be fused. According to a further aspect, the curved trocar comprises a plurality of curved trocars each having a differing radius of curvature for optimum insertion and positioning of the trocars between adjacent vertebrae of persons of various sizes. According to a further aspect, the curved trocar includes a radius of curvature of about 2 mm to 1000 mm. According to a further aspect, the curved trocar includes a radius of curvature of about 2 mm to 500 mm. According to a further aspect, the curved trocar includes a straight proximal portion, a curved portion extending from the straight proximal portion, and a straight distal portion extending from the curved portion. According to a further aspect, a longitudinal axis of the straight distal portion is disposed at an angle of about 80°-175° relative to a longitudinal axis of the straight proximal portion. According to a further aspect, the straight proximal portion is about 10 mm to 150 mm in length. According to a further aspect, the straight distal portion is about 10 mm to 50 mm in length. According to a further aspect, the curved trocar has an overall diameter of about 2 mm and 10 mm.

According to an aspect, the flexible cannula includes a straight proximal portion, a curved portion extending from the straight portion, and a straight distal portion extending from the curved portion. According to a further aspect, the straight distal portion of the flexible cannula includes a tapered tip. According to a further aspect, the straight distal portion of the flexible cannula includes a notch. According to a further aspect, a longitudinal axis of the straight distal portion of the flexible cannula is disposed at an angle of about 80°-175° relative to a longitudinal axis of the straight proximal portion. According to a further aspect, the straight proximal portion is about 10 mm to 150 mm in length. According to a further aspect, the straight distal portion is about 10 mm to 50 mm in length. According to a further aspect, the flexible cannula comprises a plurality of flexible cannulas each having successively increasing outer diameters and successively decreasing lengths, respectively, which generally maintain their shape in situ. According to a further aspect, the plurality of flexible cannulas each have an overall diameter ranging from about 4 mm to 25 mm. According to a further aspect, the plurality of flexible cannulas each have a wall thickness of about 1 mm to 2 mm.

According to an aspect, the flexible rasp device comprises a flexible shaft connected to a rasp sized to pass through the flexible cannula. According to a further aspect, the flexible rasp device include rasps of multiple lengths, sizes and cutting grades for decortication of vertebral features such as vertebral bony elements. According to a further aspect, the flexible rasp device may be manipulated by hand or driven by a tool, e.g., a drill, in order to decorticate vertebral features.

According to an aspect, the surgical instrument kit further comprises a cannula guide configured for insertion into the flexible cannula. According to a further aspect, the cannula guide comprises a plurality of cannula guides each having successively increasing outer diameters. According to a further aspect, each of the plurality of cannula guides have a straight proximal portion and a curved distal portion.

According to an aspect, the surgical instrument kit further comprises a flexible plunger for pushing or moving the bone graft delivery container through the flexible cannula, wherein the bone graft delivery container comprises a resorbable, permeable vessel, such as a suture mesh bag, containing bone graft material, which remains in situ to promote spinal fusion.

The subject disclosure provides an instrumentation system and method for performing a percutaneous spinal fusion, in particular to effectuate reliable and robust fusion of the vertebrae using less invasive techniques than those known in the art. The system and method can also be used for other applications, e.g., as a stand-alone technique for spinal fusion, a technique for minimally invasive revision spinal fusion, or combined to augment fusion with other forms of minimally invasive spinal fusion surgeries such as an anterior lumbar interbody fusion, transforaminal lumbar interbody fusion and interspinous fusion.

In accordance with an exemplary embodiment, a series of instruments is used to percutaneously fuse adjacent vertebrae utilizing a minimally invasive surgical procedure. Steps of the procedure include: 1) inserting a curved trocar percutaneously into contact with vertebral bony elements of adjacent vertebrae including, but not limited to, the transverse processes; 2) sliding a flexible cannula over the curved trocar; 3) withdrawing the trocar from the flexible cannula, whereby the flexible cannula generally maintains its shape in situ; 4) inserting a flexible rasp through the flexible cannula until it protrudes from a notch at a distal end of the flexible cannula; 5) moving the rasp manually or by a drill to decorticate the vertebral bony elements of adjacent vertebrae; 6) removing the rasp from the flexible cannula; 7) inserting a bone graft delivery system bag containing bone graft material through the flexible cannula until it is discharged from the notch at the distal end of the flexible cannula for placement onto vertebral structures to be fused, e.g., adjacent vertebral bony elements; and 8) removing the flexible cannula from the patient.

In accordance with another exemplary embodiment, a series of instruments is used to percutaneously fuse adjacent vertebrae utilizing a minimally invasive surgical procedure. Steps of the procedure include: 1) inserting a curved trocar percutaneously into contact with vertebral bony elements of adjacent vertebrae including, but not limited to, the transverse processes; 2) sliding a first flexible cannula over the curved trocar; 3) withdrawing the trocar from the first flexible cannula, whereby the first flexible cannula generally maintains its shape in situ; 4) inserting a first cannula guide into the first flexible cannula; 5) sliding a second flexible cannula having an internal diameter larger than the outer diameters of the first cannula guide and first flexible cannula over the first cannula guide and the first flexible cannula, whereby the second flexible cannula generally maintains its shape in situ; 6) removing the first cannula guide and first flexible cannula from the second flexible cannula; 7) repeating steps 4 through 6 using second and subsequent cannula guides of increasing outer diameters and third and subsequent flexible cannulas of increasing inner diameters larger than the outer diameters of the second flexible cannula and the second and subsequent cannula guides; 8) inserting a flexible rasp through a last-placed flexible cannula until it protrudes from a notch at a distal end of the last placed flexible cannula; 9) moving the rasp manually or by a drill to decorticate the vertebral bony elements of adjacent vertebrae; 10) removing the rasp from the last-placed flexible cannula; 11) inserting a bone graft delivery system bag containing bone graft material through the last-placed flexible cannula until it is discharged from the notch at the distal end of the last placed flexible cannula for placement onto vertebral structures to be fused, e.g., adjacent vertebral bony elements; and 12) removing the last-placed flexible cannula from the patient. The present spinal fusion instrumentation system is designed to ensure ease of use and allows for a rapid surgical procedure to create a spinal fusion thus saving operating room time.

The exemplary embodiments of the present disclosure provide a series of instruments that allow for creation of a fusion bed between transverse processes without wide surgical dissection.

Other features and advantages of the subject disclosure will be apparent from the following more detail description of the exemplary embodiments.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DISCLOSURE

Figure 2:
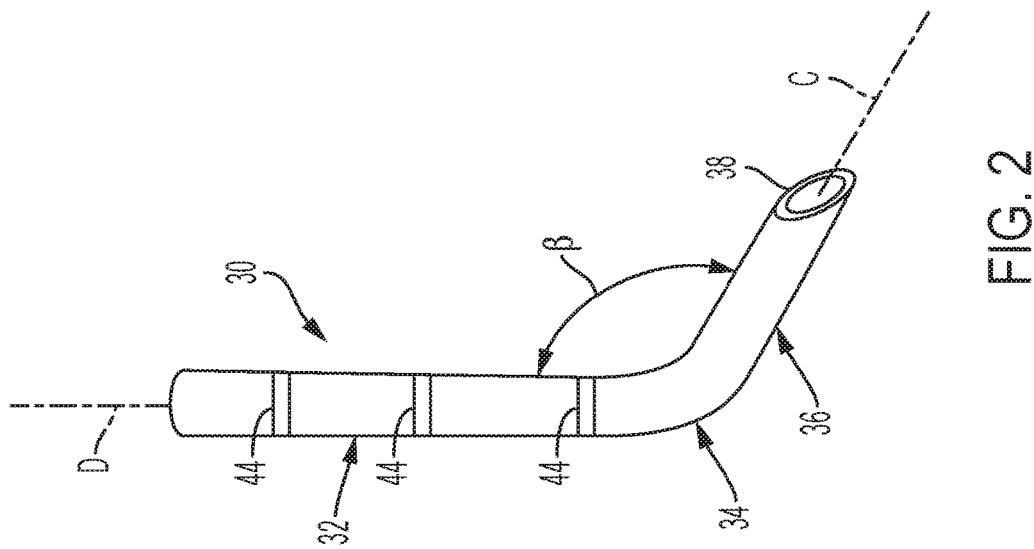
FIG. 2 is a perspective view of a flexible cannula of the surgical instrument kit according to an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

In accordance with an exemplary embodiment of the subject disclosure there is provided a surgical instrument kit for performing a spinal fusion. The surgical instrument kit comprises a curved trocar 10, a flexible cannula 30 for positioning over the curved trocar, a flexible rasp device 70, and a bone graft delivery container 90, each of which are described below. The surgical instrument kit may additionally include at least one cannula guide 50 for placement of successively larger flexible cannulas, a plunger 80 for moving the bone graft delivery container within the flexible cannula, and flexible guide wires 100a, 100b for contacting vertebral structure and facilitating selection of an appropriate curved trocar.

Figure 1:
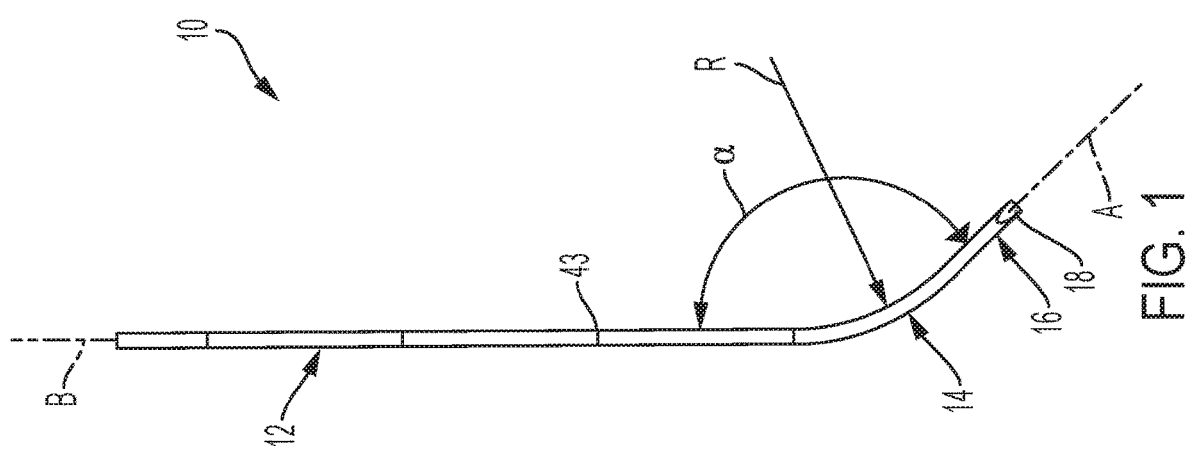
FIG. 1 is a perspective view of a curved trocar of a surgical instrument kit according to an exemplary embodiment of the subject disclosure.

Referring now to the drawings, FIG. 1 illustrates a curved trocar 10 in accordance with an exemplary embodiment of the present disclosure. The curved trocar 10 includes a straight proximal portion 12 adapted for grasping by a user, a curved portion 14 extending from the straight proximal portion, and a straight distal portion 16 extending from the curved portion. According to an aspect, the straight proximal portion 12 of the curved trocar can have a length of about 10 mm to 150 mm in length, but can alternatively be about 20, 30, 40, 50, 60, 70, 80, 90, 100, 110, 120, 130, 140 and 160 mm in length. According to a further aspect, the curved portion 14 of the curved trocar includes a radius of curvature "R" of about 2 mm to 1000 mm, and preferably about 2 mm to 500 mm, but can alternatively be about 10, 25, 50, 75, 100, 125, 150, 175, 200, 225, 250, 275, 300, 400, 600, 700, 800, 900 and 1,100 mm. The curved portion 14 may be configured as a continuous curve with a constant radius of curvature, or alternatively formed from a plurality of varying radii of curvatures or from a plurality of linear segments forming a substantially curved portion. According to another aspect, the straight distal portion 16 of the curved trocar can have a length of about 10 mm to 50 mm in length, but can alternatively be about 15, 20, 25, 30, 35, 40, 45, 55 and 60 mm. Any of the dimensions of the straight proximal portion, the straight distal portion and the curved portion may be varied to provide a plurality of differently configured curved trocars.

According to a further aspect, the surgical instrument kit comprises a plurality of curved trocars each having a differing radius of curvature and/or differing lengths of the straight proximal portion and/or differing lengths of the straight distal portion. Similarly, the dimensions of the straight proximal portion, the straight distal portion and the curved portion of the trocars may be varied in order to be particularly adapted for patient-specific applications based on patients' unique spinal physiologies.

By way of example, but not limitation, an exemplary surgical instrument kit in accordance with the present disclosure may include from about 1 to 24 trocars of varying sizes, shapes and curvatures to accommodate patients spanning at least the $5^{th}$ to $95^{th}$ percentile of the height, weight or other physiological parameters of patients likely to undergo a surgical procedure as described herein.

A longitudinal axis "A" of the straight distal portion 16 of the curved trocar 10 is disposed at an angle α of about 90°-175° relative to a longitudinal axis "B" of the straight proximal portion 12, but can alternatively be about 80, 100, 110, 120, 130, 140, 150, 160, and 170 degrees.

The curved trocar 10 may be formed from any suitable rigid material including metal, e.g., stainless steel, or a rigid polymer.

The curved trocar has an overall diameter of about 2 mm to 10 mm, and preferably about 2 mm to 5 mm, but can alternatively have an overall diameter of about 1, 3, 4, 6, 7, 8, 9, 11 and 12 mm. The distal end of the trocar has a sharpened tip 18 to facilitate passage of the curved trocar through skin, muscle and other bodily tissue. Additionally, the proximal end of the straight proximal portion may include an unillustrated fixed or removable handle to facilitate percutaneous manipulation of the straight distal portion of the trocar adjacent vertebral bony elements of spinal vertebrae.

Figure 2A:
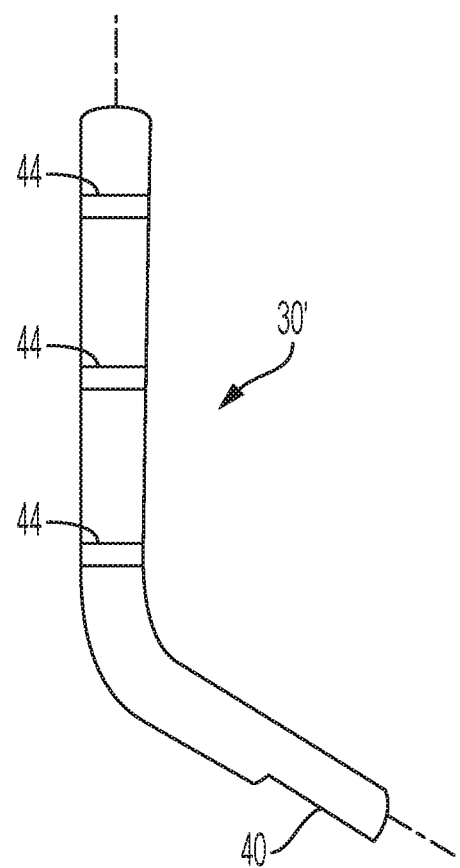
FIG. 2A is a perspective view of another flexible cannula of the surgical instrument kit according to an exemplary embodiment of the subject disclosure.
Figure 2B:
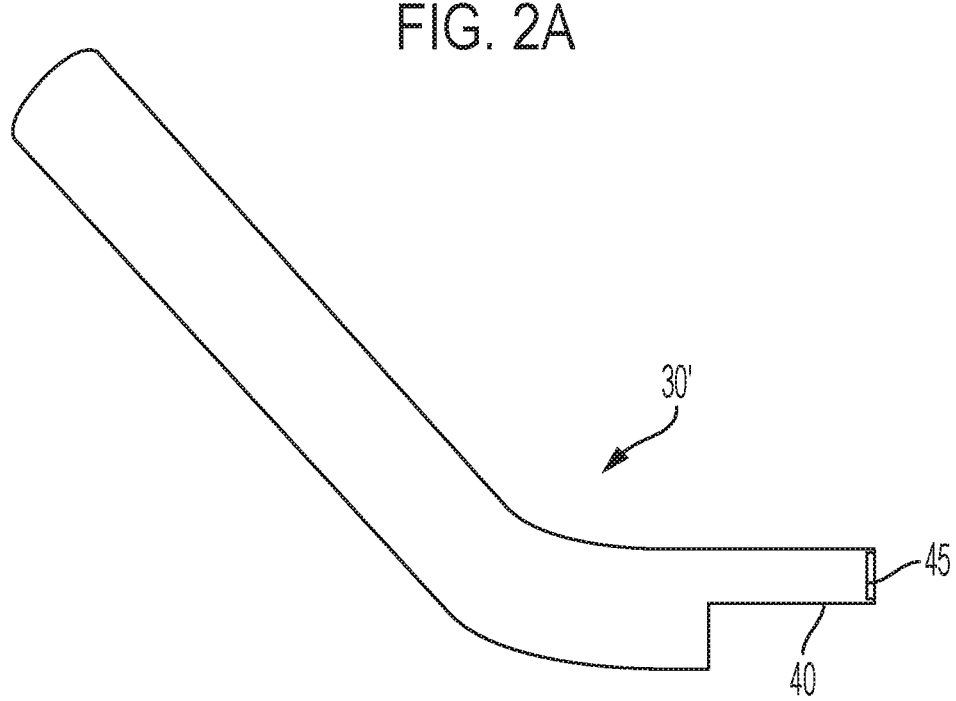
FIG. 2B is a side view of the flexible cannula of FIG. 2A.

FIG. 2 illustrates an exemplary embodiment of a flexible cannula 30 applicable to the subject disclosure, whereas FIGS. 2A and 2B illustrate another exemplary embodiment of a flexible cannula 30' applicable to the subject disclosure. Each of the flexible cannulas 30 and 30' can have the dimensions and shape described below. Referring to FIG. 2, the flexible cannula 30 includes a straight proximal portion 32, a curved portion 34 extending from the straight proximal portion, and a straight distal portion 36 extending from the curved portion. A longitudinal axis "C" of the straight distal portion 36 of the flexible cannula is disposed at an angle β of about 90°-175° relative to a longitudinal axis "D" of the straight proximal portion 32, but can alternatively be about 80, 100, 110, 120, 130, 140, 150, 160, and 170 degrees. The straight proximal portion 32 can be about 10 mm to 150 mm in length, but can alternatively be about 10, 20, 30, 40, 50, 60, 70, 80, 90, 100, 110, 120, 130, 140 and 160 mm. In addition, the straight distal portion 36 can be about 10 mm to 50 mm in length, but can alternatively be about 15, 20, 25, 30, 35, 40, 45, 55 and 60 mm. The straight distal portion of the flexible cannula 30 can include a tapered tip 38 (e.g., a beveled tip) to facilitate passage of the flexible cannula through skin, muscle and other bodily tissue.

Referring to FIGS. 2A and 2B, the straight distal portion of the flexible cannula 30' can include a notch 40. In the present exemplary embodiment, the notch is configured as a substantially rectangular notch opening forming a downwardly-directed substantially half-tube. The notch is sized to accommodate movement of a decorticating rasp of the flexible rasp device 70 and placement of bone graft delivery container 90 onto vertebrae to be fused, in the manner described below. More specifically, the notch is sized to have a longitudinal length to control the length of bone to be decorticated by the rasp between the adjacent processes.

The flexible cannulas 30 and 30', as well as flexible cannulas 30a-30d described below, can be curved or bent as described above, or straight. Additionally, they can be formed from any suitable flexible material including, without limitation, Nitinol or a flexible polymer. The flexible cannulas are structured to generally maintain a bent shape in situ, e.g., their original predefined curvature. In addition, the flexible cannulas can have markings 44 along their length to identify the depth of insertion of the cannulas, including when the cannulas are fully inserted in a patient. Moreover, the flexible cannulas can be provided with radiopaque markers 45 e.g., and, without limitation, at their distal ends for enhanced visibility when the surgical procedure is performed under intraoperative fluoroscopy.

Figure 3A:
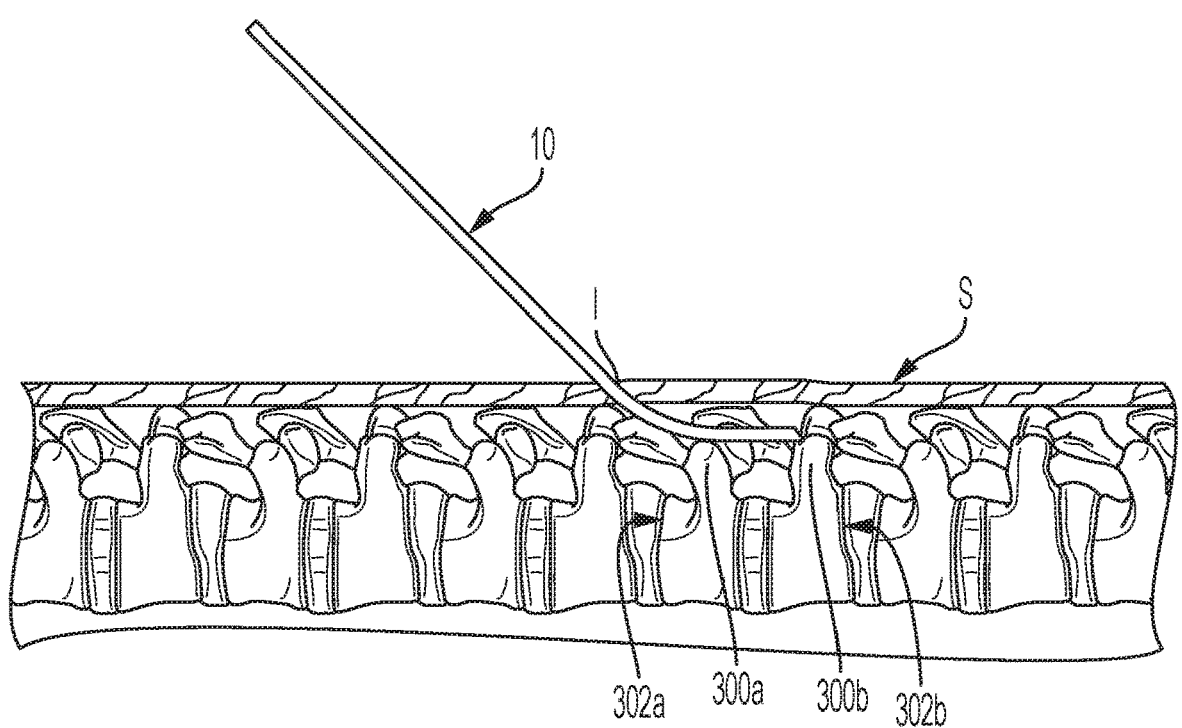
FIGS. 3A-3T sequentially illustrate a surgical procedure using a surgical instrument kit according to an exemplary embodiment of the subject disclosure.
Figure 3B:
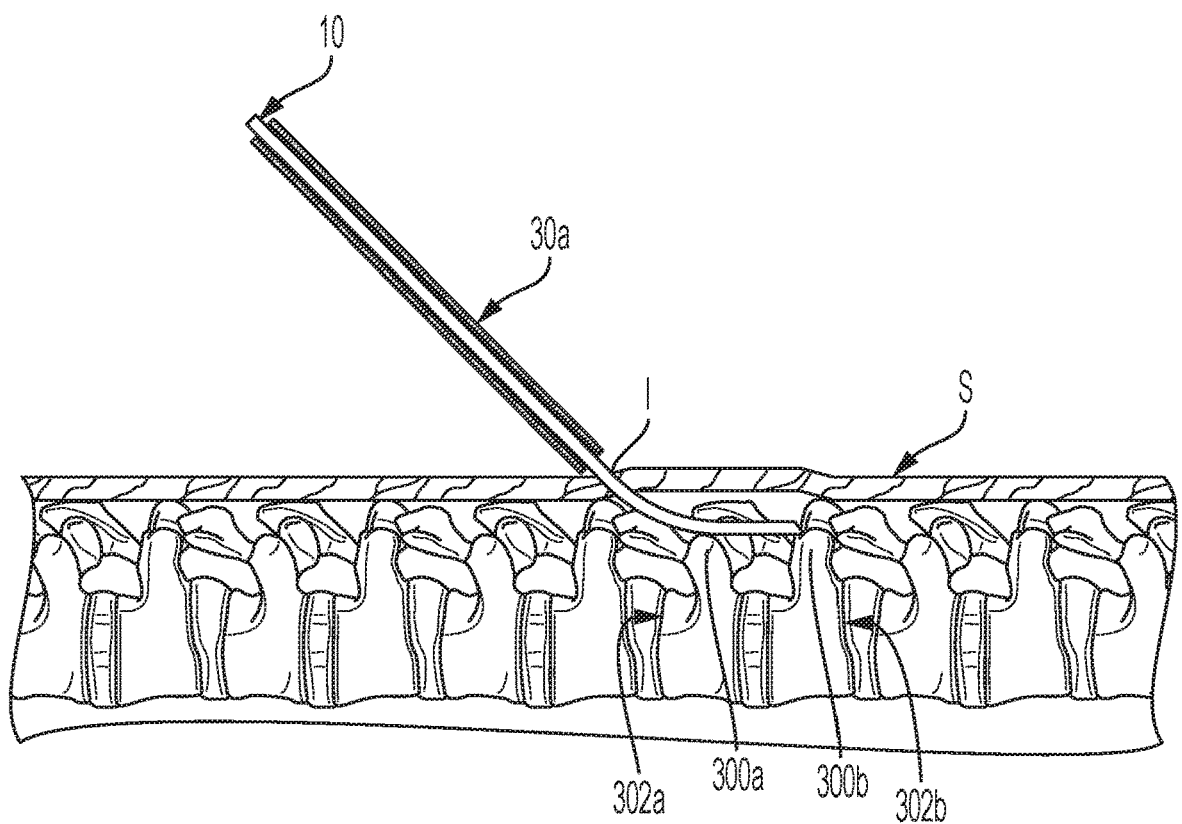
Figure 3C:
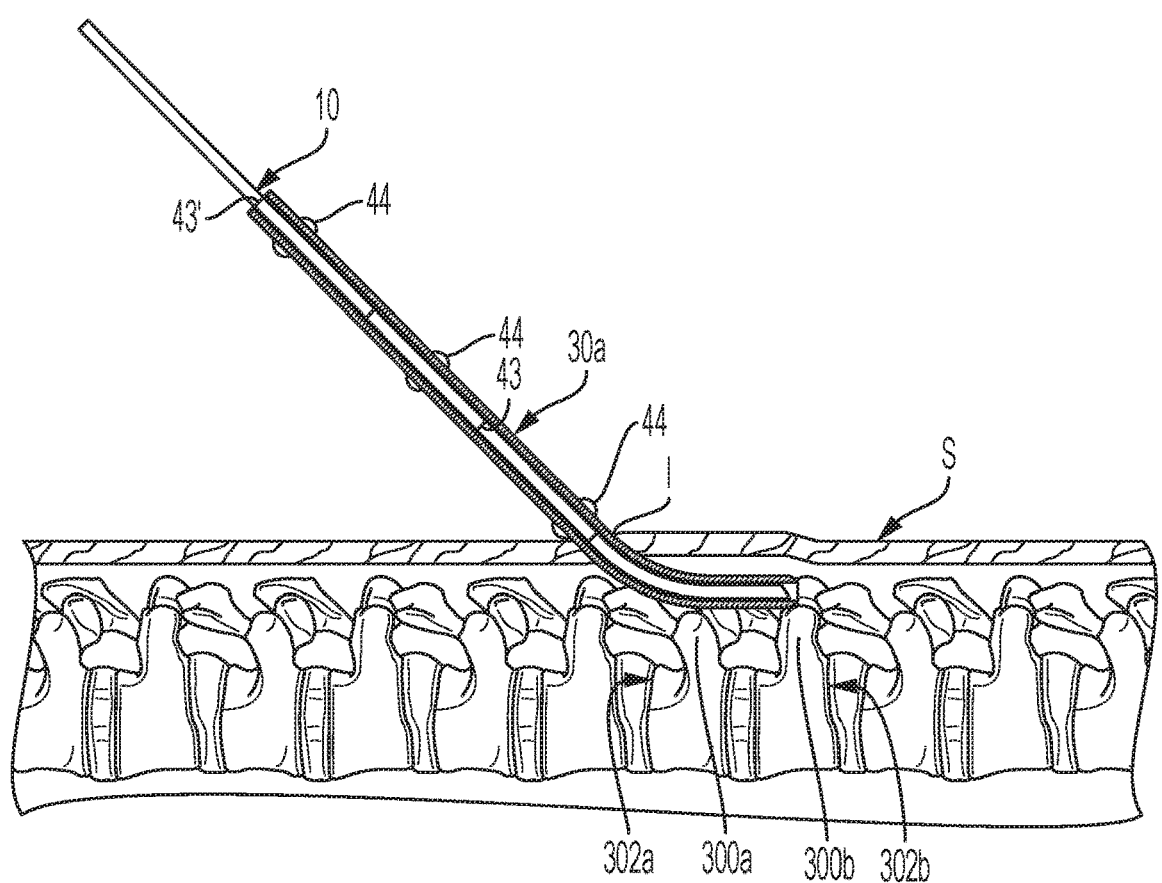
Figure 3D:
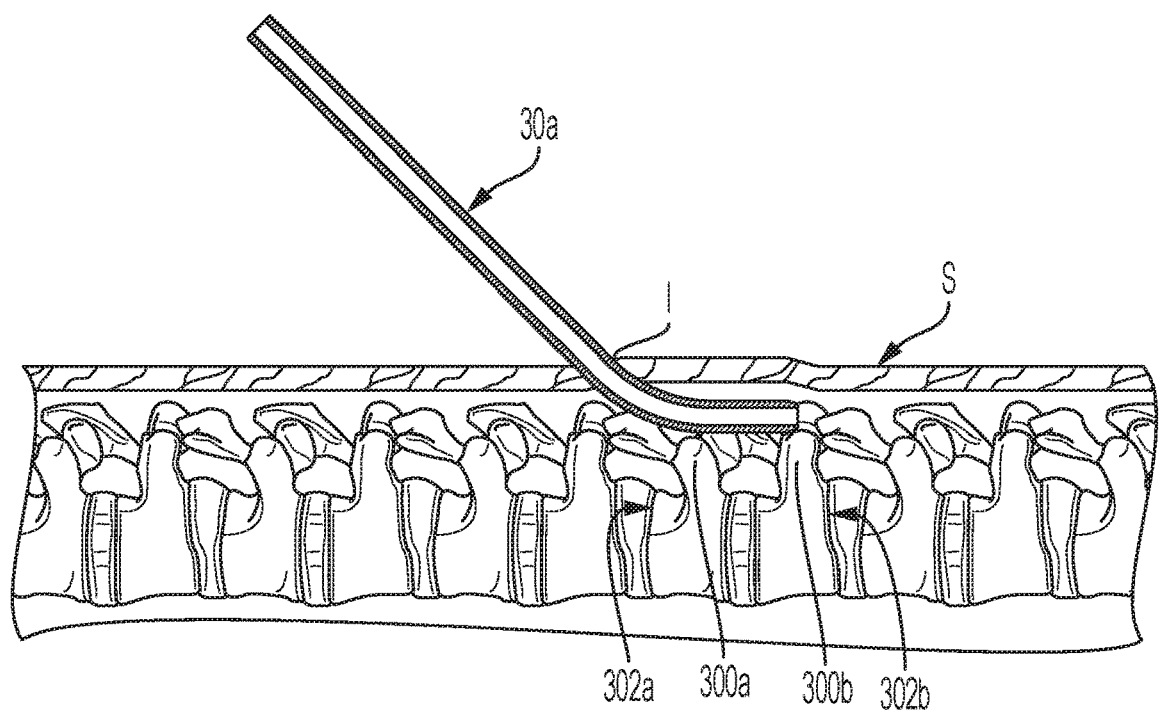
Figure 3E:
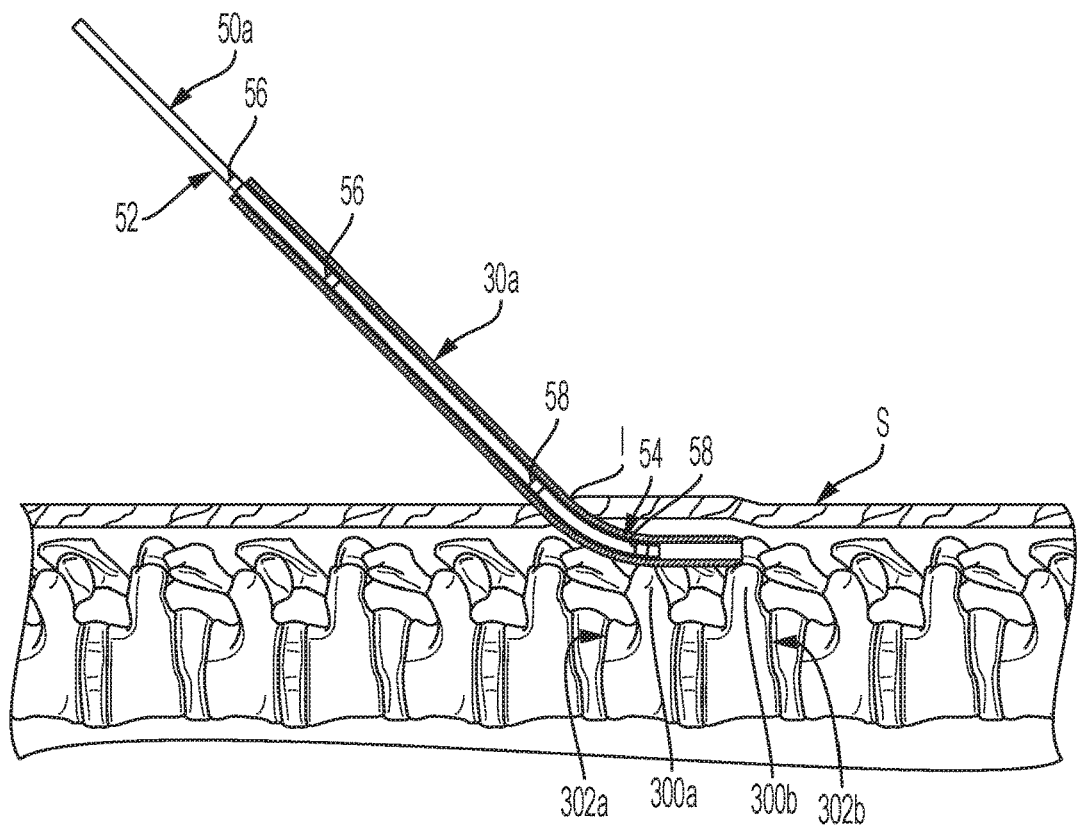
Figure 3F:
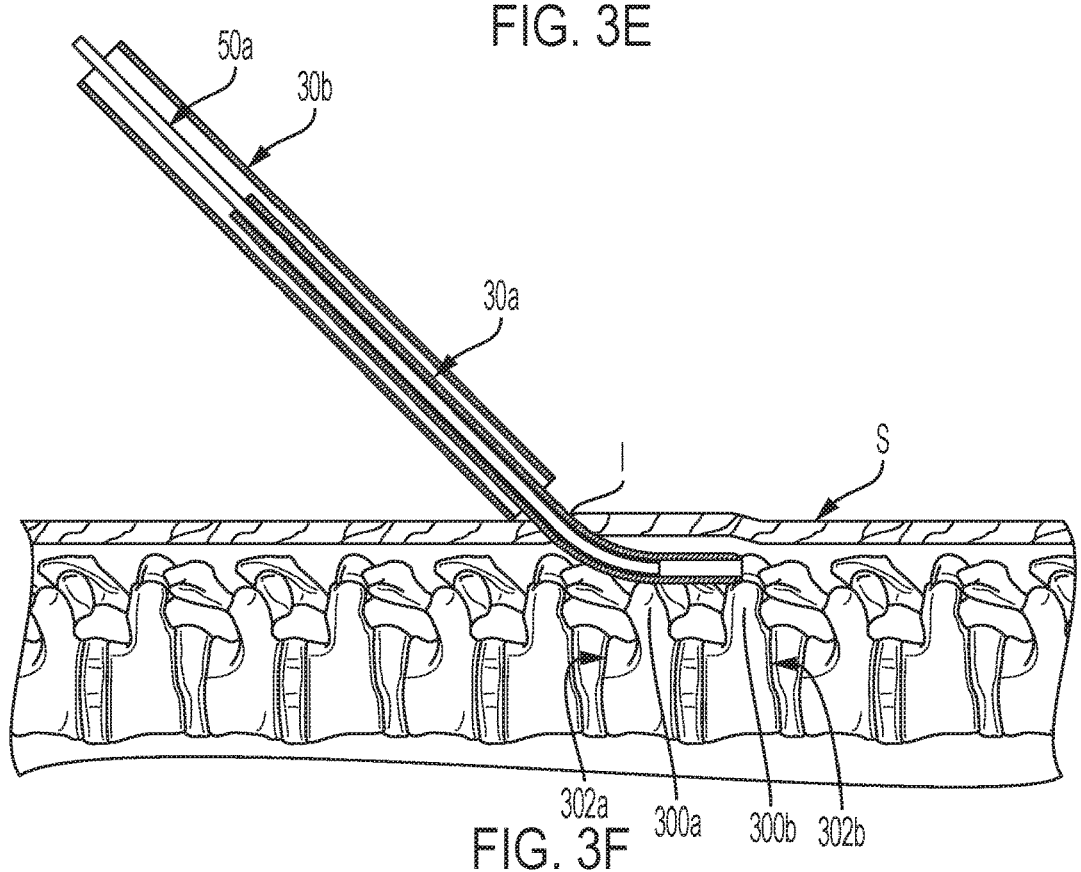
Figure 3G:
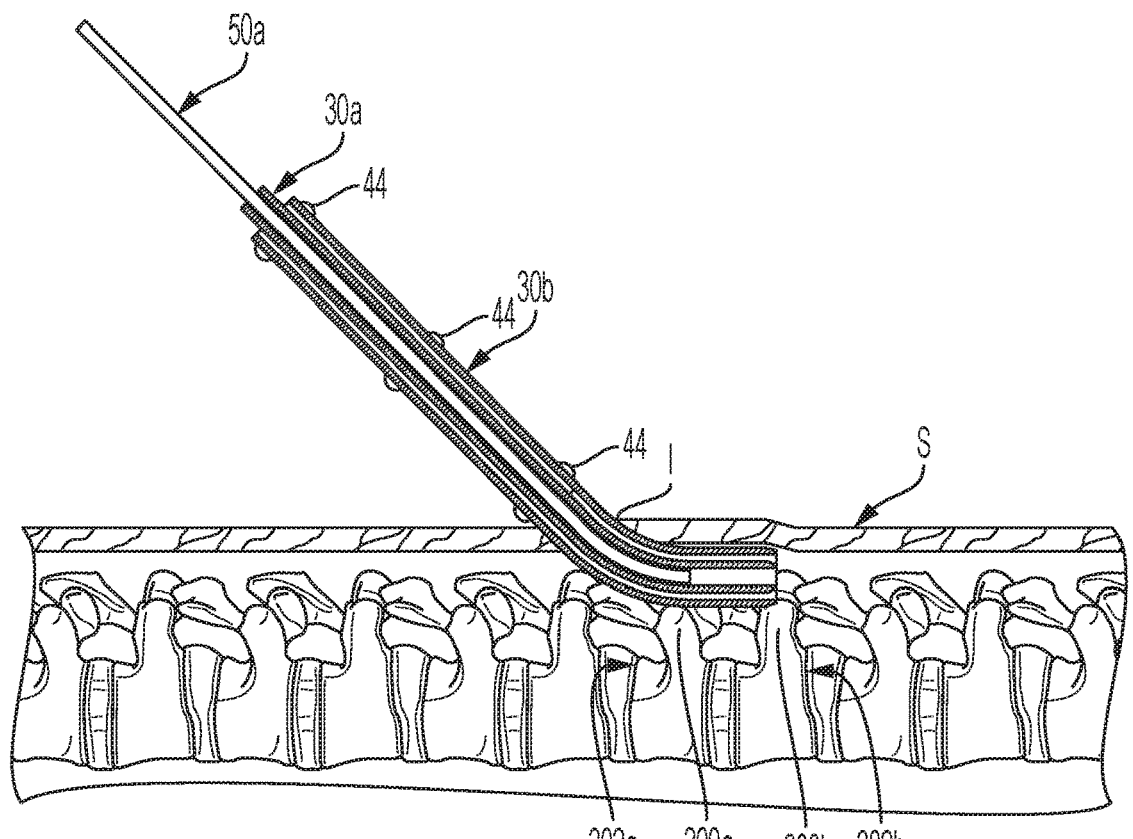
Figure 3H:
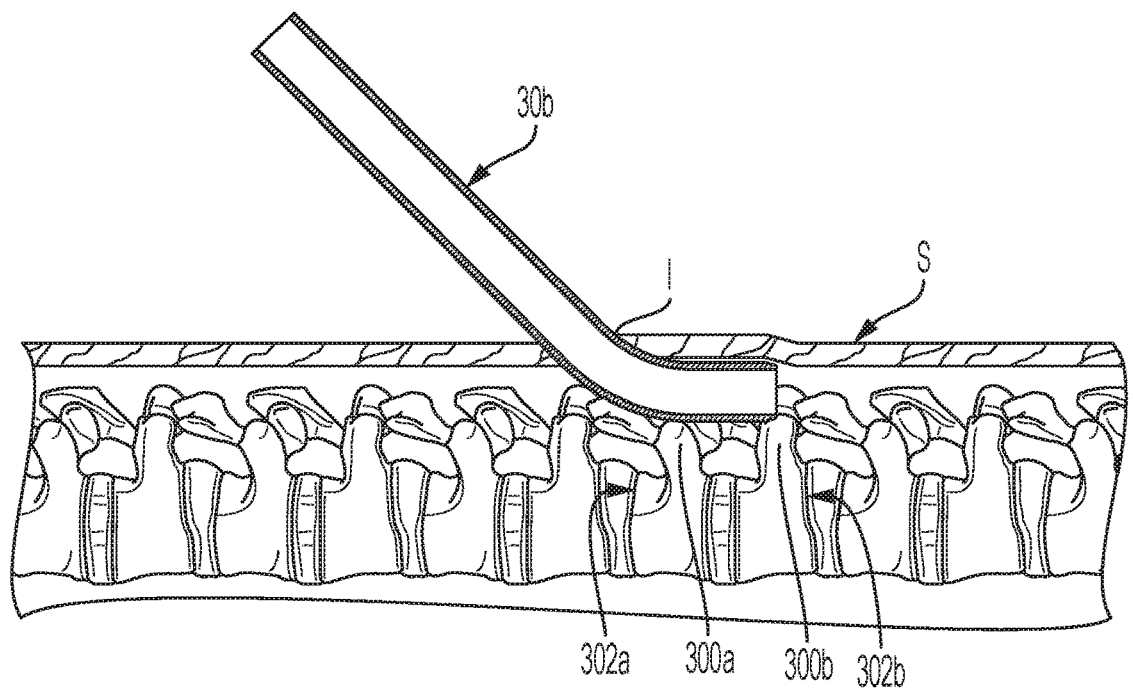
Figure 3I:
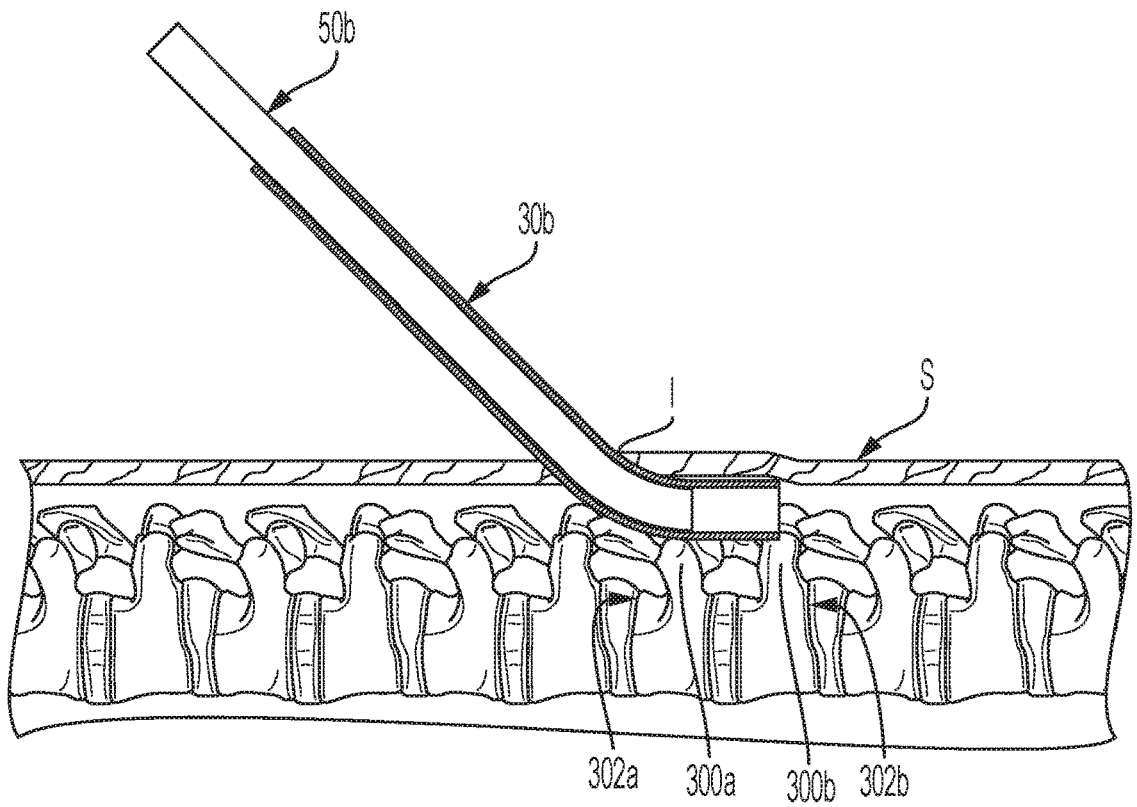
Figure 3J:
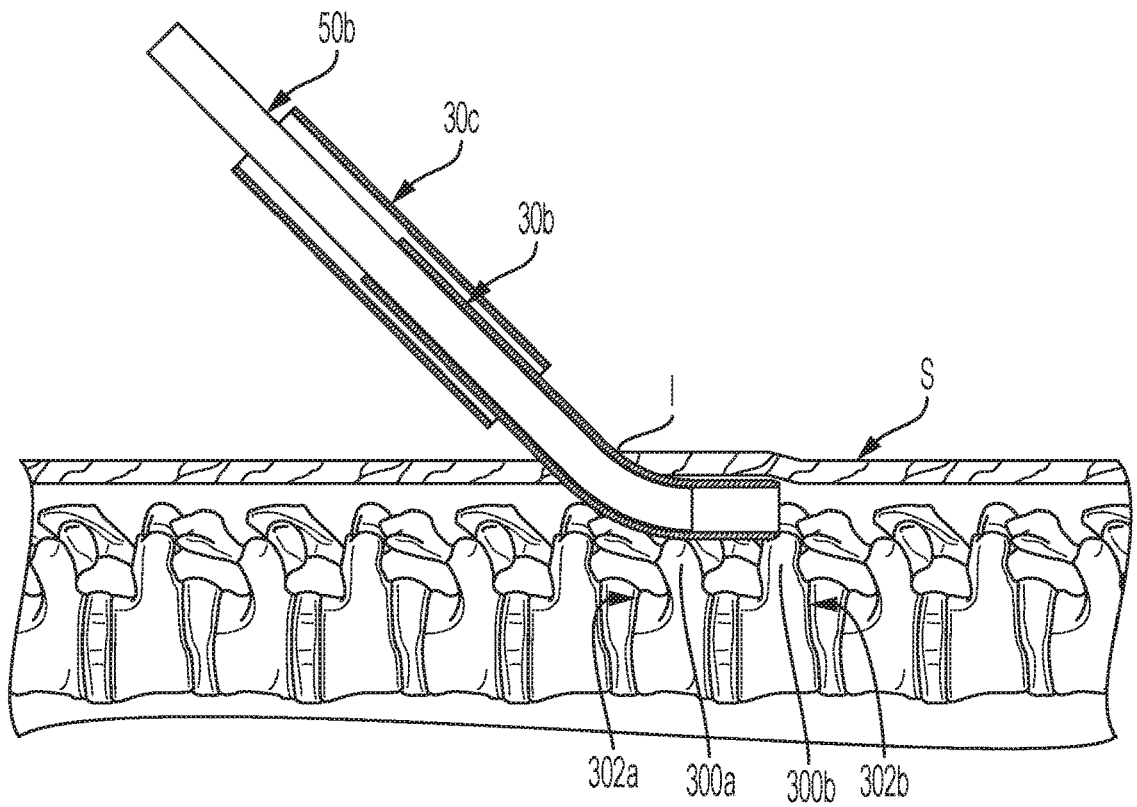
Figure 3K:
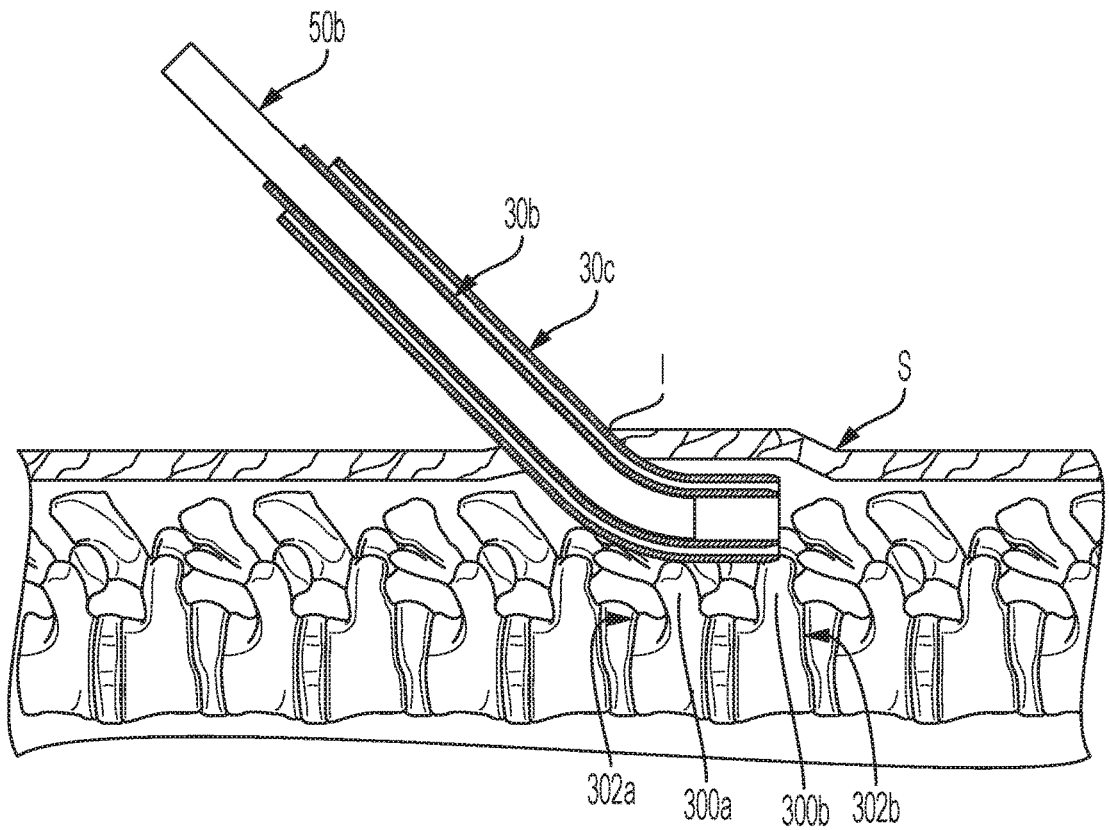
Figure 3L:
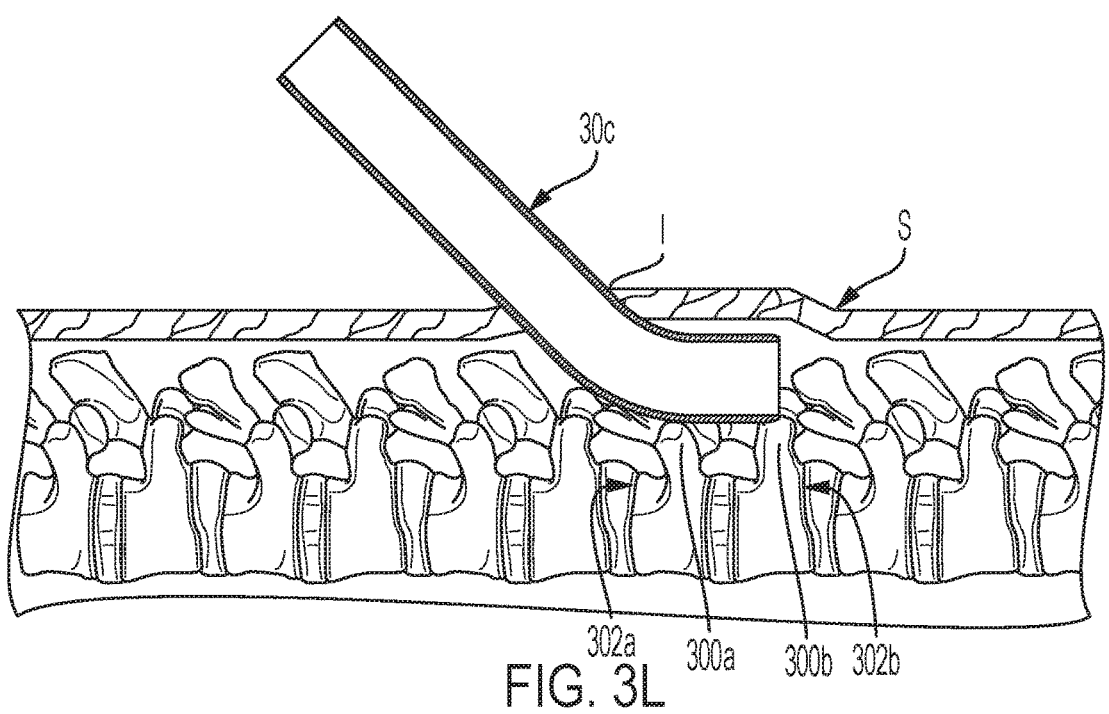
Figure 3M:
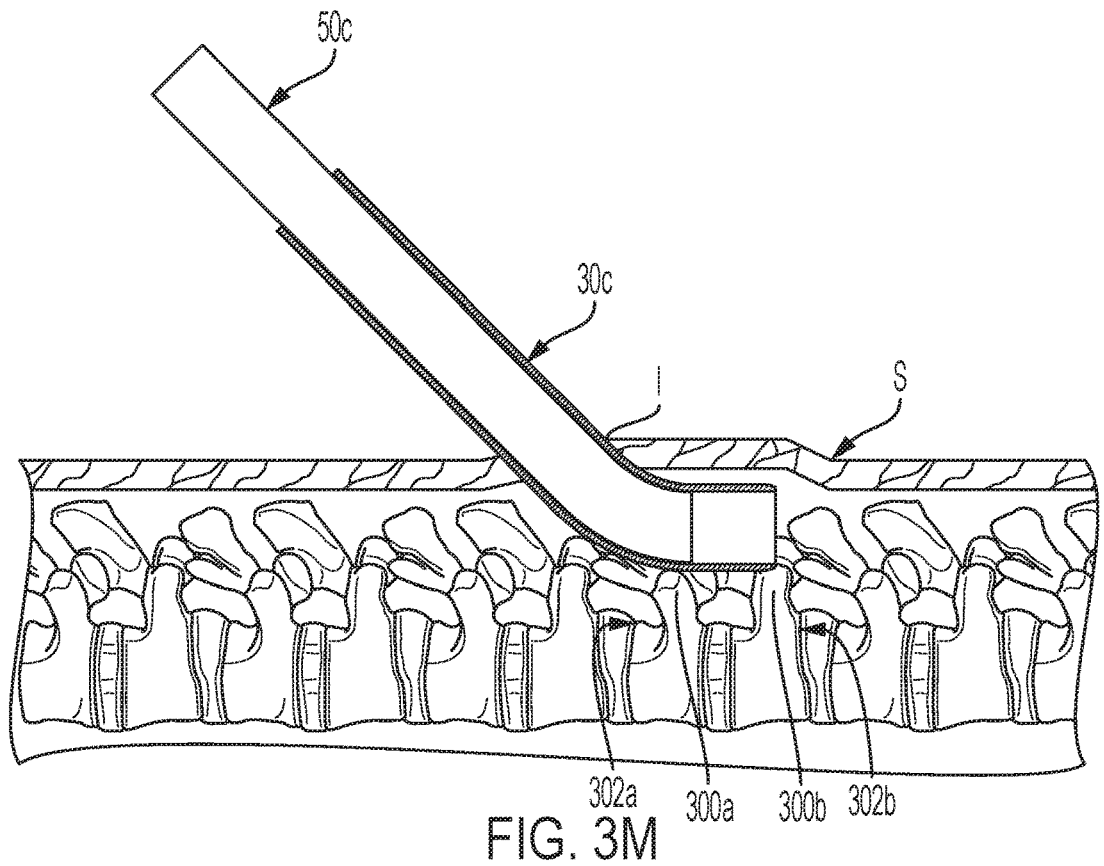
Figure 3N:
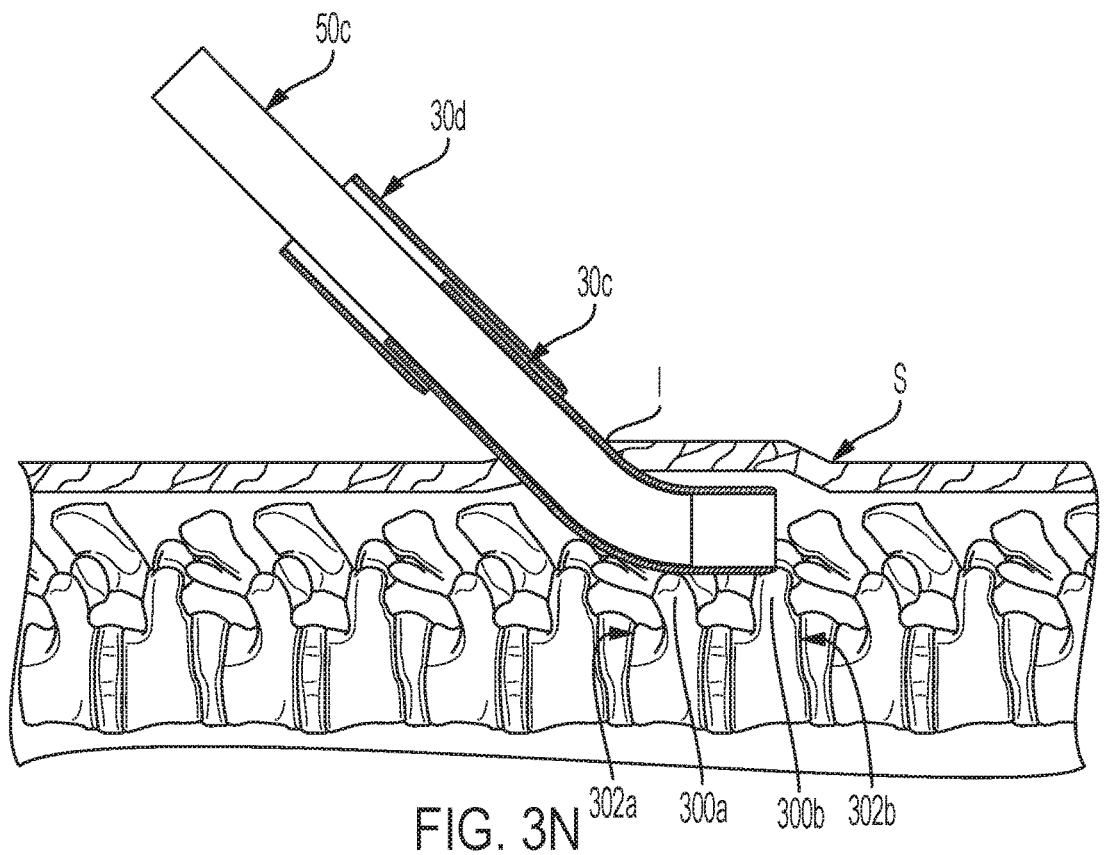
Figure 3O:
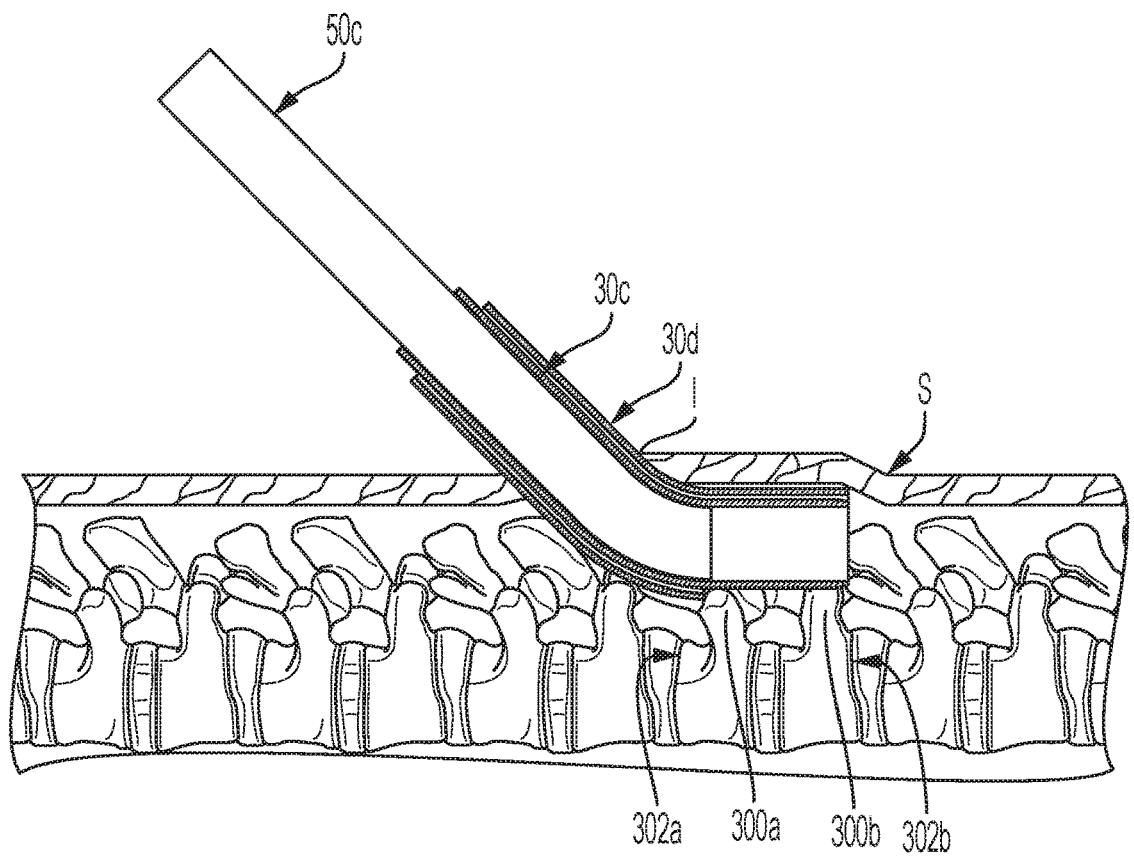
Figure 3P:
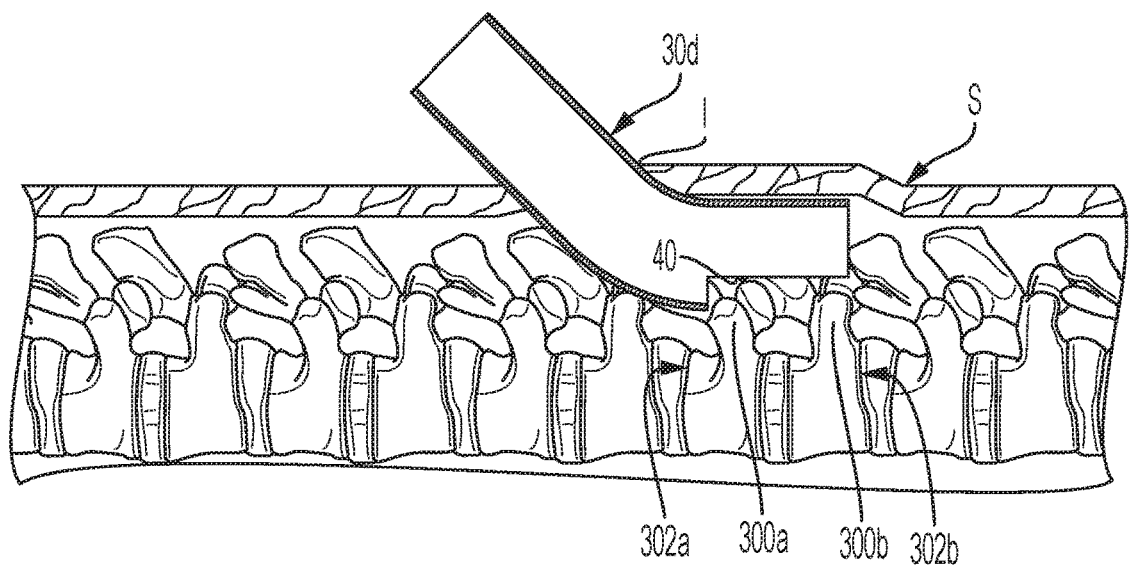
Figure 3Q:
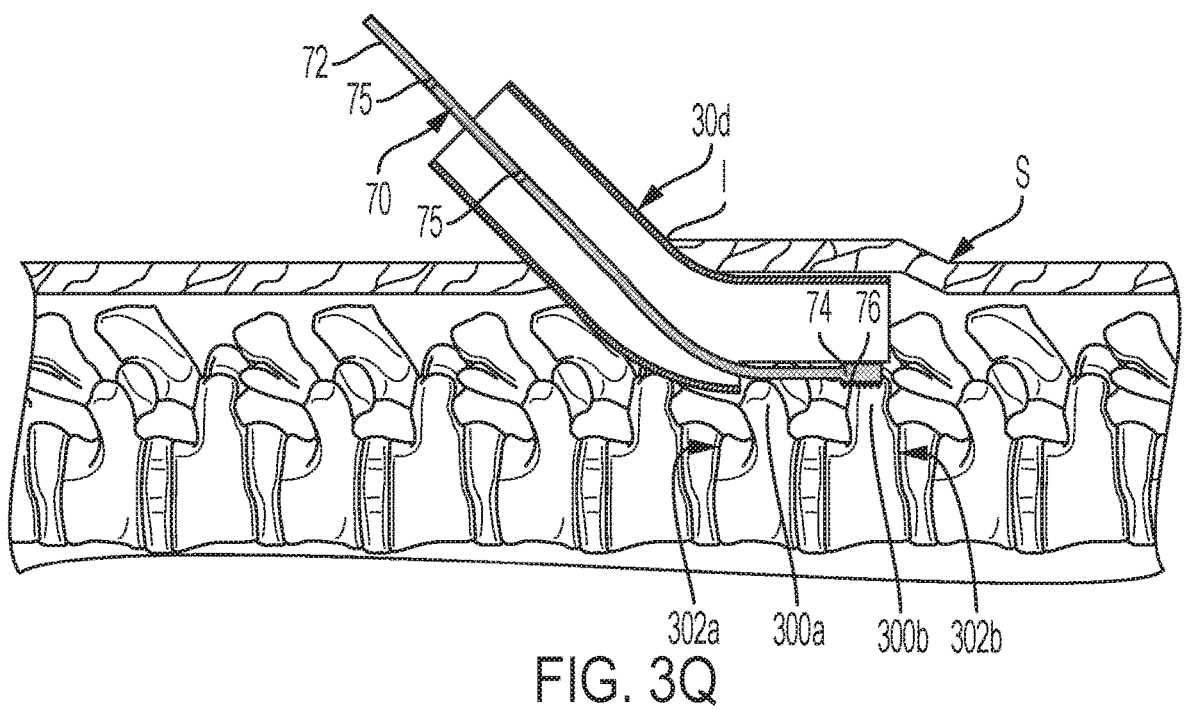
Figure 3R:
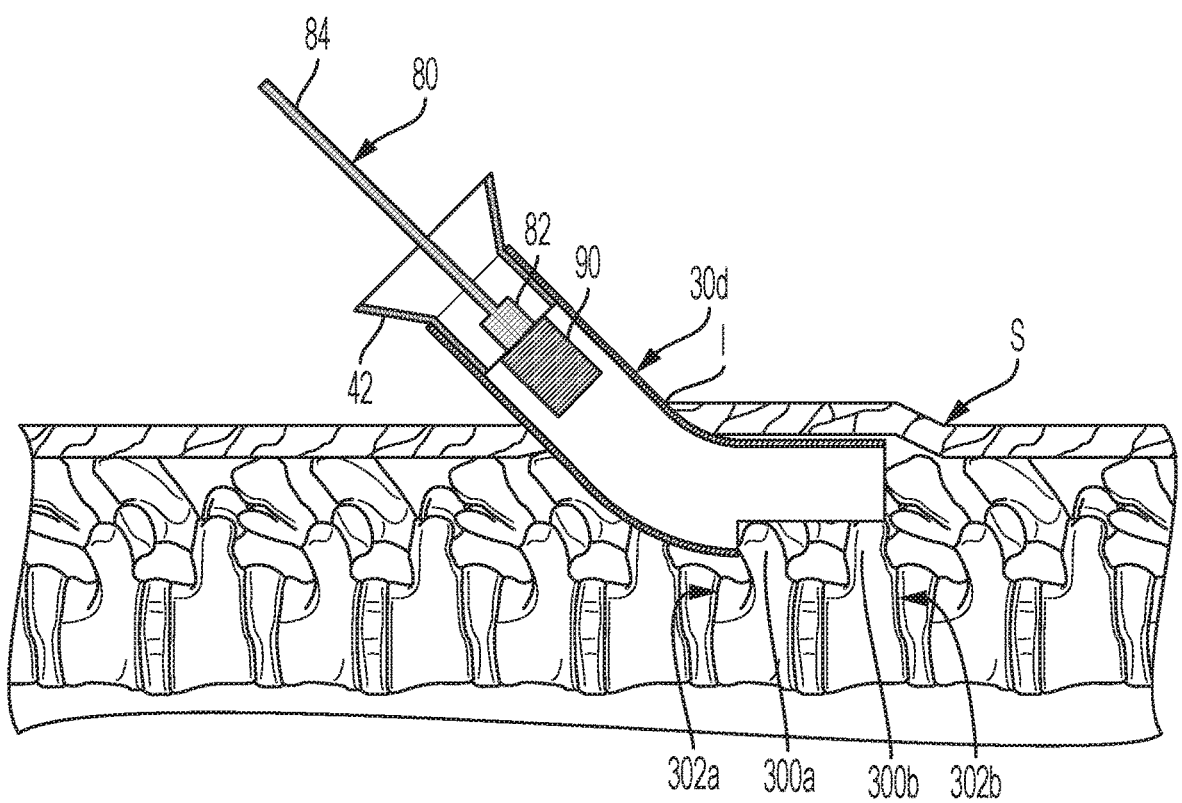
Figure 3S:
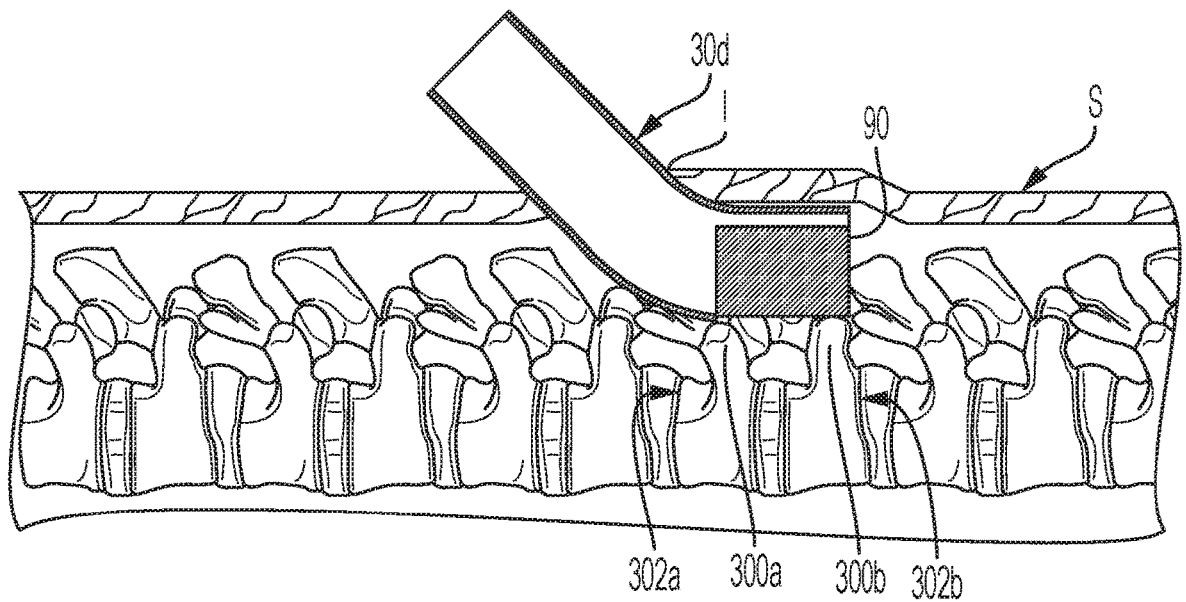

FIGS. 3B-3S illustrate the surgical instrument kit comprising a plurality of flexible cannulas 30a-30d each having successively increasing outer diameters and successively decreasing lengths, respectively. According to an aspect, the plurality of flexible cannulas each have an overall diameter ranging from about 4 mm to 25 mm, but can alternatively be about 3, 5, 6, 7, 8, 9, 10, 11, 12, 13, 14, 15, 16, 17, 18, 19, 20, 21, 22, 23, 24, 26, 27 and 28 mm. Further, the plurality of flexible cannulas 30a-30d each have a wall thickness of about 1 mm to 2 mm, including 0.9, 1.1, 1.2, 1.3, 1.4, 1.5, 1.6, 1.7, 1.8, 1.9 and 2.1 mm.

As shown in FIGS. 3E-3G, 3I-3K and 3M-3O, the surgical instrument kit further comprises a plurality of cannula guides 50a-50c each having successively increasing outer diameters configured for insertion into the flexible cannulas 30a-30c. Each of the cannula guides have a straight proximal portion 52 and a curved distal portion 54 extending from the straight proximal portion, as shown for example in FIG. 3E. The cannula guides may be formed from flexible to rigid materials. If made of radiolucent material, the cannula guides can have radiopaque indicators 58 (FIG. 3E) along their length for enhanced visibility when the surgical procedure is performed under intraoperative fluoroscopy.

FIG. 3Q illustrates that the flexible rasp device 70 of the surgical instrument kit comprises a flexible shaft 72 connected to a rasp 74 sized to pass through the flexible cannula 30d. The flexible shaft can have markings 75 along its length to identify the depth of insertion of the rasp. In the present exemplary embodiment, the rasp 74 is flat with a rough rasping surface 76, as shown.

FIG. 3R illustrates that the surgical instrument kit further includes a plunger 80 for placing and moving the bone graft delivery container 90 within the flexible cannula 30d, as described below. The plunger 80 includes a distal tip 82 and a flexible shaft 84 extending proximally from the tip. The tip 82 is preferably formed of a radiopaque material or other material such that it can be visible under fluoroscopy. That is, the tip can be formed from a metal, e.g., stainless steel, or a rigid polymer provided with radiopaque markers.

Figure 3T:
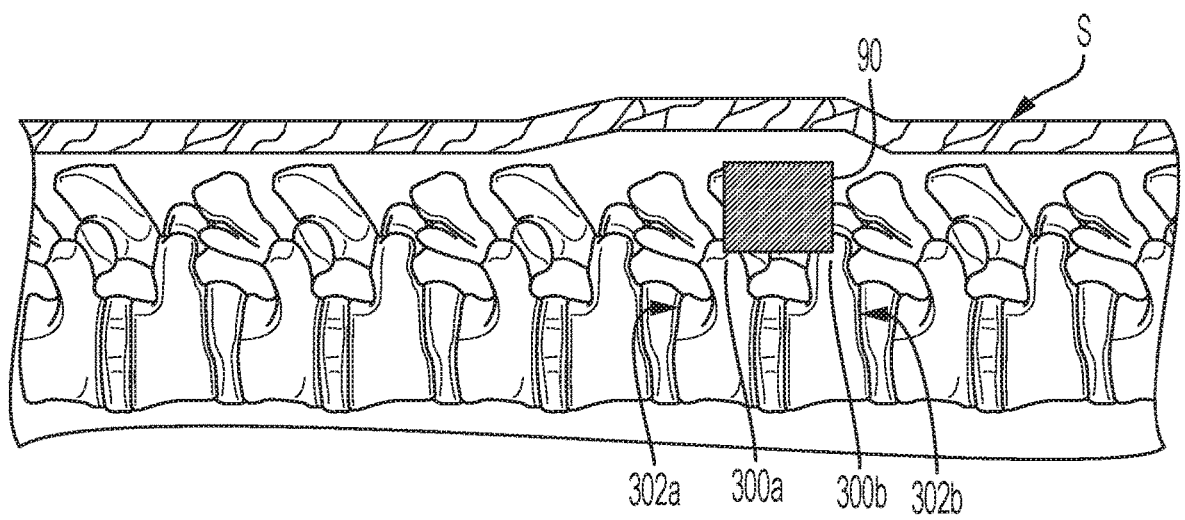

FIG. 3S illustrates the bone graft delivery container 90 as placed by the plunger 80 at a grafting site, e.g., across the decorticated vertebral bony elements to be fused; and FIG. 3T shows the bone graft delivery container at the grafting site with the flexible cannula 30d removed from the patient.

Figure 4A:
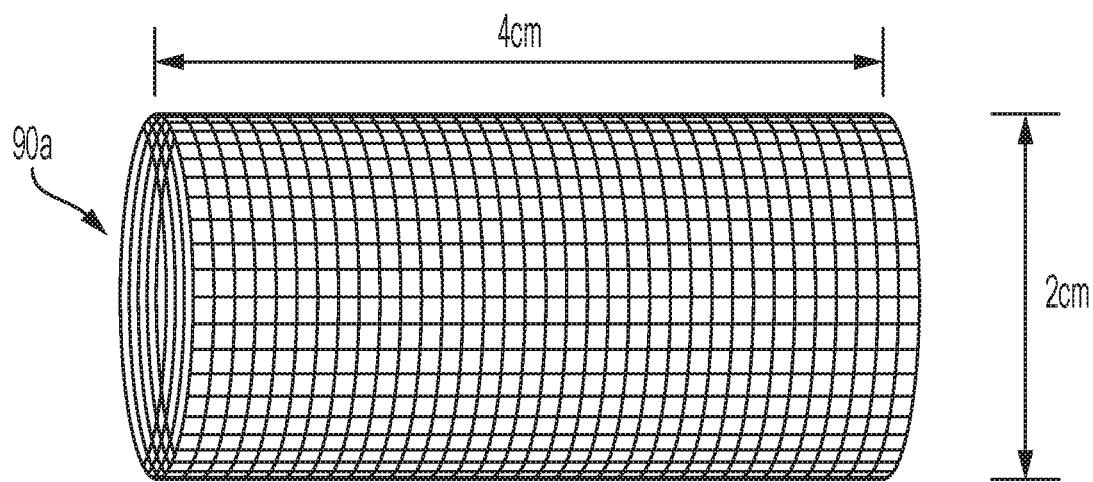
FIGS. 4A and 4B are perspective views of bone graft delivery containers of the surgical instrument kit according to an exemplary embodiment of the subject disclosure.
Figure 4B:
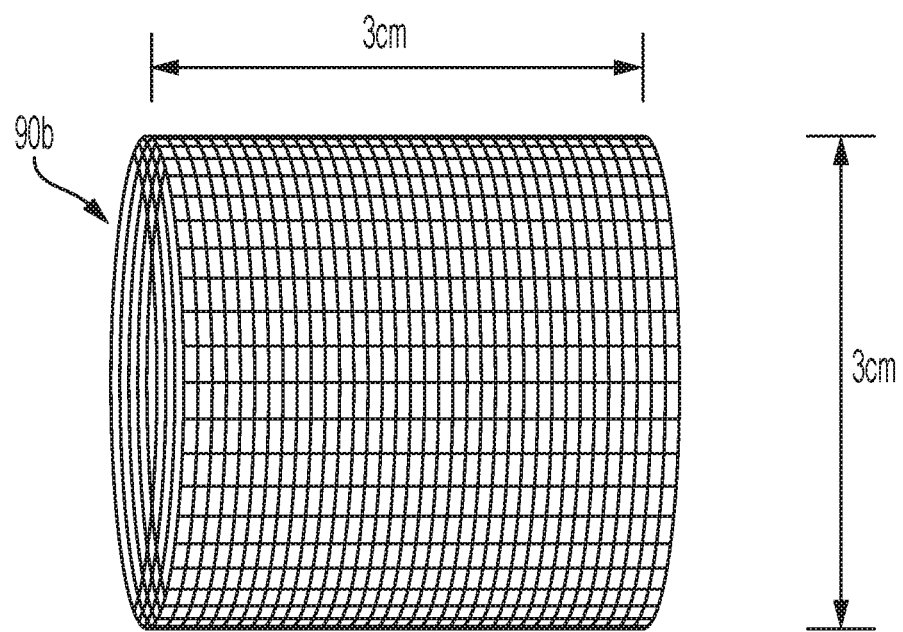

FIGS. 4A and 4B illustrate two different exemplary embodiments of bone graft delivery systems e.g., containers or bags 90a and 90b, respectively, which contain bone graft material, and are suitable for use with the surgical instrument kit of the present disclosure. Each of the bone graft delivery systems can be formed from permeable and/or resorbable materials including, without limitation, bioabsorbable suture mesh, such as chromic gut or vicryl. In the present embodiment the bone graft delivery systems can be formed as a bag 90a, the bag is e.g., about 4 cm in length and 2 cm in diameter, and bag 90b is about 3 cm in length and 3 cm in diameter. Alternatively, the bags may have a length smaller or larger than 4 cm, e.g., 2, 3, 5 and 6 cm, and a diameter more or less than 3 cm, e.g., 2 and 4 cm, including 0.1 cm increments thereof. Bags 90a and 90b are filled with a therapeutic effective amount of bone graft material sufficient to effectuate fusion of adjacent vertebral structures such as vertebral bony elements. However, bags 90a and 90b are not so filled with bone graft material as to prevent radial compression of the bags sufficient to enable their insertion and passage through at least the largest flexible cannula described herein.

Figure 5:
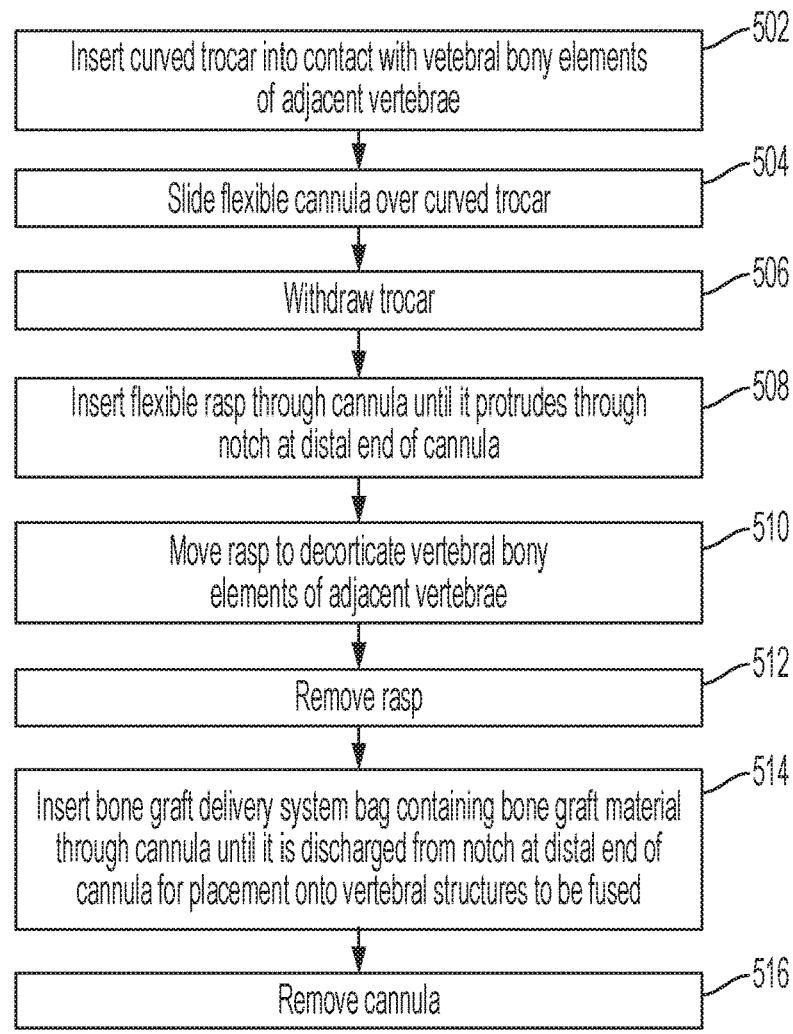
FIG. 5 is a flow chart of a spinal fusion surgical procedure using at least some of the instruments of the surgical instrument kit according to an exemplary embodiment of the subject disclosure.

FIG. 5 is a flow chart generally depicting the steps of a method of using at least some of the surgical instruments described hereinabove in a spinal fusion surgical procedure. A first step 502 involves a user inserting a curved trocar percutaneously into contact with vertebral bony elements of adjacent vertebrae. At step 504, a user slides a flexible cannula over the curved trocar and inserts the cannula such that its distal end is positioned adjacent the distal end of the trocar. At step 506, the user withdraws the trocar from the flexible cannula whereby the flexible cannula generally maintains its shape in situ. At step 508, the user inserts a flexible rasp through the flexible cannula until it protrudes from a distal end of the flexible cannula. At step 510, the user moves the rasp to decorticate the vertebral bony elements of adjacent vertebrae aligned with the distal end of the flexible cannula. At step 512, the user removes the rasp from the flexible cannula. At step 514, the user inserts a bone graft delivery system containing bone graft material through the flexible cannula until it is discharged from the distal end of the flexible cannula for placement onto the decorticated vertebral structures to be fused, e.g., adjacent vertebral bony elements, to create posterolateral fusion mass between vertebral bodies. Lastly, at step 516, the user removes the flexible cannula from the patient.

Returning to FIGS. 3A-3T, the figures sequentially illustrate a surgical procedure using the surgical instrument kit according to the subject disclosure. The surgical procedure (a single incision procedure) enables a user, e.g., a surgeon, to perform a percutaneous in-situ spinal fusion that lays down bone graft material between adjacent aspects e.g., the transverse processes, of the cervical, thoracic and lumbar spinal regions via a single incision. In particular, the illustrated embodiment represents a lumbar spine application of the surgical procedure.

Referring first to FIG. 3A, there is shown the straight distal portion and the curved portion of the curved trocar 10 inserted percutaneously through a single 1-2 cm incision "I" and beneath a patient's skin layer "S" to a depth of about 5 mm to 12.5 mm, although the depth of insertion can alternatively be about 3, 4, 6, 7, 8, 9, 10, 11, 12, 13, 14 and 15 mm, depending on the depth of the bony formations, e.g., the transverse processes 300a, 300b, of the vertebrae 302a, 302b to be fused.

The user selects the size and curvature of the curved trocar based on examination of pre-operative imaging. This determines the alignment of the transverse processes between adjacent vertebrae to select the appropriate radius of curvature. Similarly, by examining the depth of the transverse process in relation to the skin surface, a user can select the size of the straight proximal portion 12 (FIG. 1). Once an approximate selection is made, the user can trial the curved trocar to determine if it indeed follows a path between the transverse processes.

FIG. 3B shows a first flexible cannula 30a positioned over the straight proximal portion of the curved trocar, and FIG. 3C shows the first flexible cannula 30a inserted into the patient's bodily tissue until its distal end is generally coextensive with the distal end of the curved trocar. For example, the distal ends of the first flexible cannula and curved trocar can be aligned by matching the depth of insertion of the curved trocar via external markings 43 thereon with the depth of insertion of the first flexible cannula via external markers 44 therein. (Markers 44 in FIG. 3C are shown as bumps as the first flexible cannula is shown in cross-section, but are representative of external markings as shown in FIG. 2). Alternatively, the distal ends of the first flexible cannula and curved trocar can be aligned by matching the overall length of the first flexible cannula (e.g., 150 mm length) with a corresponding overall length marker 43' (e.g., 150 mm marker) on the external surface of the curved trocar. In the presently shown figures, the first flexible cannula is a flexible cannula having an outer diameter of 3 mm, for exemplary discussion purposes. According to an aspect, the curved trocar 10 has an outer diameter of about 2 mm to 3 mm and the flexible cannula has an outer diameter of about 6 mm, a wall thickness of up to about 1 mm, and an inner diameter of about 4 mm.

FIG. 3D shows that the next step of the surgical procedure is the removal of the curved trocar from the first flexible cannula 30a, whereby the first flexible cannula generally maintains a bent shape in situ with the straight distal portion thereof disposed above the bony formations 300a, 300b of the vertebrae 302a, 302b to be fused.

The next step of the surgical procedure is shown in FIG. 3E. In particular, the first cannula guide 50a, which has e.g., a diameter of about 4 mm, is inserted into the first flexible cannula 30a until its curved portion 54 is received within the curved portion of the first flexible cannula, as indicated by reference to the markers 56 exposed on the side of the first cannula guide.

With the first cannula guide 50a inserted into the first flexible cannula 30a, the next step in the procedure is to position a second flexible cannula 30b (FIG. 3F), which e.g., has an internal diameter of, e.g., 10 mm, over the straight proximal portions of the first cannula guide and the first flexible cannula, as shown in FIG. 3F. FIG. 3G shows the second flexible cannula 30b inserted into the patient's bodily tissue until its distal end is generally coextensive with the distal end of the first flexible cannula 30a, e.g., via markers on the guide and cannula as discussed above. It should be noted that, according to an aspect, the length of the second flexible cannula 30b is less than the length of the first flexible cannula 30a so that the user can grasp the proximal end of the first flexible cannula and withdraw it from the second flexible cannula 30b.

FIG. 3H shows that the next step of the surgical procedure is the removal of the first cannula guide 50a and the first flexible cannula 30a from the second flexible cannula 30b, whereby the second flexible cannula generally maintains a bent shape in situ with the straight distal portion thereof disposed above the bony formations 300a, 300b of the vertebrae 302a, 302b to be fused.

The next step of the surgical procedure is shown in FIG. 3I. In particular, a second cannula guide 50b, which e.g., has a diameter of about 10 mm, is inserted into the second flexible cannula 30b until its curved portion is received within the curved portion of the second flexible cannula.

With the second cannula guide 50b inserted into the second flexible cannula 30b, the next step in the procedure is to position a third flexible cannula 30c, which may have an internal diameter of, e.g., 16 mm, over the straight proximal portions of the second cannula guide and the second flexible cannula, as shown in FIG. 3J. FIG. 3K shows the third flexible cannula 30c inserted into the patient's bodily tissue until its distal end is generally coextensive with the distal end of the second flexible cannula 30b, e.g., via markers on the guide and cannula as discussed above. It should be noted that, according to an aspect, the length of the third flexible cannula 30c is less than the length of the second flexible cannula 30b so that the user can grasp the proximal end of the second flexible cannula and withdraw it from the third flexible cannula, as well as view external markings thereon.

FIG. 3L shows that the next step of the surgical procedure is the removal of the second cannula guide 50b and the second flexible cannula 30b from the third flexible cannula 30c, whereby the third flexible cannula generally maintains a bent shape in situ with the straight distal portion thereof disposed above the bony formations 300a, 300b of the vertebrae 302a, 302b to be fused.

The next step of the surgical procedure is shown in FIG. 3M. In particular, a third cannula guide 50c, which has a diameter of about 16 mm, is inserted into the third flexible cannula 30c until its curved portion is received within the curved portion of the third flexible cannula.

With the third cannula guide 50c inserted into the third flexible cannula 30c, the next step in the procedure is to position a fourth flexible cannula 30d, which may have an internal diameter of, e.g., 20 mm, over the straight proximal portions of the third cannula guide and the third flexible cannula, as shown in FIG. 3N. FIG. 3O shows the fourth flexible cannula 30d inserted into the patient's bodily tissue until its distal end is generally coextensive with the distal end of the third flexible cannula 30c by reference to external markers on the third flexible cannula. It should be noted that, according to an aspect, the length of the fourth flexible cannula 30d is less than the length of the third flexible cannula 30c so that the user can grasp the proximal end of the third flexible cannula and withdraw it from the fourth flexible cannula, as well as view external markers thereon.

FIG. 3P shows that the next step of the surgical procedure is the removal of the third cannula guide 50c and the third flexible cannula 30c from the fourth flexible cannula 30d, whereby the fourth flexible cannula generally maintains a bent shape in situ with the straight distal portion thereof disposed above the bony formations 300a, 300b of the vertebrae 302a, 302b to be fused. As shown in FIG. 3P, the distal end of the fourth flexible cannula can include a notch 40, which is sized to extend a length between transverse processes of adjacent vertebrae.

Figure 10:
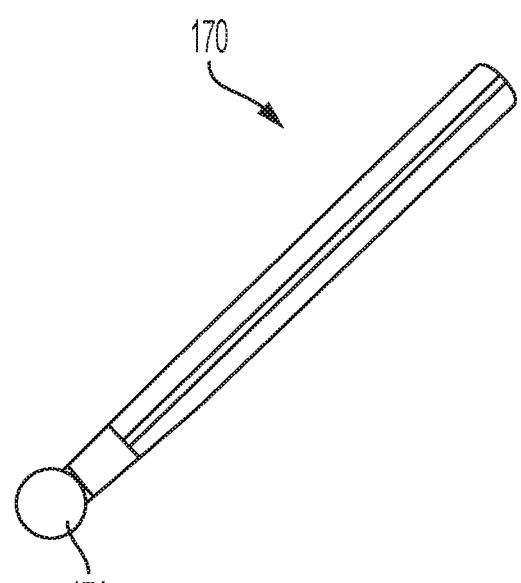
FIG. 10 is a perspective view of a rasp device including a ball tip end cutting mill suitable for decorticating bone.

FIG. 3Q shows the next step of the surgical procedure, namely, insertion of the flexible rasp device 70 of the surgical instrument kit through the fourth flexible cannula 30d until the rasp projects from the notch 40 at the distal end of the fourth flexible cannula. With the rasp 74 so positioned, the rasp may be moved back and forth in a sawing motion across the bony elements 300a, 300b to be decorticated. Movement of the rasp and length of travel is guided by the length of the notch. Alternatively, the rasp device 170 can have a ball or burr tip or similar end cutting mill 174 (FIG. 10) whereby the flexible shaft 72 may be connected to a rotatable drive such as a drill or the like, whereby the end cutting mill can decorticate bony elements. In either case, the rasp or the end cutting mill may come in multiple lengths, sizes and/or cutting grades to achieve the desired decortication effect.

As shown in FIG. 3R, the next step of the surgical procedure is the introduction of the bone graft delivery container 90 in the fourth flexible cannula 30d using the plunger 80. To facilitate insertion of the bone graft delivery container 90 into the fourth flexible cannula, the mouth of the fourth flexible cannula may be fitted with a permanent or removable funnel 42. The plunger 80 is used to push and move the bone graft delivery container 90 through the fourth flexible cannula until the bone graft delivery container is situated at notch 40 above the bony elements 300a, 300b to be grafted, after which the plunger is removed as shown in FIG. 3S. FIG. 3T shows that the final flexible cannula 30d has been removed with the bone graft delivery container 90 remaining in situ at the grafting site.

The foregoing surgical procedure can be summarized as follows. A series of instruments is used to percutaneously fuse adjacent vertebrae utilizing a minimally invasive surgical procedure. Steps of the surgical procedure include: 1) inserting a curved trocar percutaneously into contact with vertebral bony elements of adjacent vertebrae including, but not limited to, the transverse processes; 2) sliding a first flexible cannula over the curved trocar; 3) withdrawing the trocar from the first flexible cannula, whereby the first flexible cannula generally maintains its shape in situ; 4) inserting a first cannula guide into the first flexible cannula; 5) sliding a second flexible cannula having an internal diameter larger than the outer diameters of the first cannula guide and first flexible cannula over the first cannula guide and the first flexible cannula until the distal end of the second flexible cannula is adjacent the distal end of the first flexible cannula, whereby the second flexible cannula generally maintains its shape in situ; 6) removing the first cannula guide and first flexible cannula from the second flexible cannula; 7) repeating steps 4 through 6 using second and subsequent cannula guides of increasing outer diameters and third and subsequent flexible cannulas of increasing inner diameters larger than the outer diameters of the second flexible cannula and the second and subsequent cannula guides; 8) inserting a flexible rasp through a last-placed flexible cannula until it protrudes from a notch at a distal end of the last placed flexible cannula; 9) moving the rasp manually or by a drill to decorticate the vertebral bony elements of adjacent vertebrae; 10) removing the rasp from the last-placed flexible cannula; 11) inserting a bone graft delivery system bag containing bone graft material through the last-placed flexible cannula until it is discharged from the notch at the distal end of the last-placed flexible cannula for placement onto vertebral structures to be fused, e.g., adjacent vertebral bony elements; and 12) removing the last-placed flexible cannula from the patient.

Figure 6:
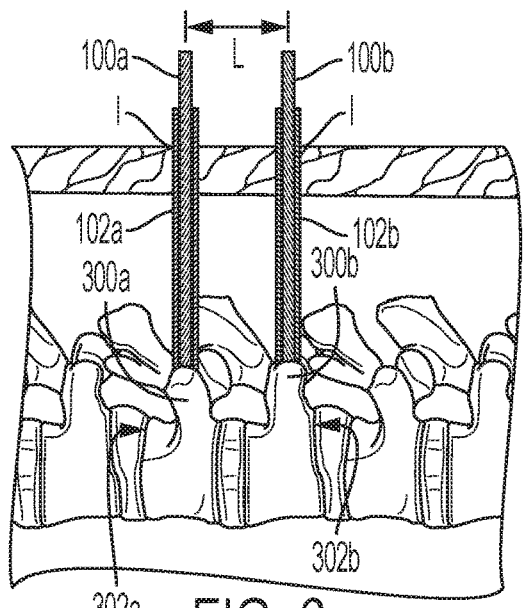
FIG. 6 is a side view of an initial step of another spinal fusion surgical procedure using instruments of a surgical instrument kit according to another exemplary embodiment of the subject disclosure.

FIG. 6 illustrates another spinal fusion surgical procedure using instruments of a surgical instrument kit according to another exemplary embodiment of the subject disclosure. More particularly, FIG. 6 illustrates placement of two flexible and directable guide wires 100a, 100b on the vertebral bony elements 300a, 300b of adjacent vertebrae 302a, 302b through two incisions "I". This procedure may also be referred to as a one and one-half incision procedure, wherein an approximately 0.5 cm incision is made distally and a stab incision is made proximally. Images of the patient's spine using anterior-posterior and lateral films are preferably used to accurately position the guide wires 100a, 100b on the vertebral bony elements such as the transverse processes. To facilitate their placement, the guide wires may pass through cannulated needles 102a, 102B, respectively, which can be removed once the distal ends of the guide wires contact the bony elements. Using the guide wires as guides, the end cutting mill 174 can be used to decorticate the bony elements contacted by the guide wires. Placement of the guide wires is used to select an optimal sized and curved trocar to create a path between the bony elements. Flexible cannulas of increasing diameter are then placed as described in the above procedures followed by placement of a bone graft delivery system bag in the manner described above.

Figure 7A:
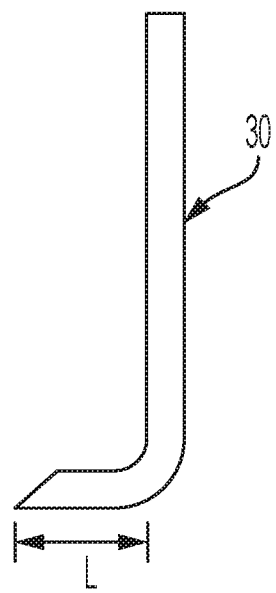
FIGS. 7A and 7B show flexible cannulas suitable for use after the initial step of the spinal fusion surgical procedure of FIG. 6.
Figure 7B:
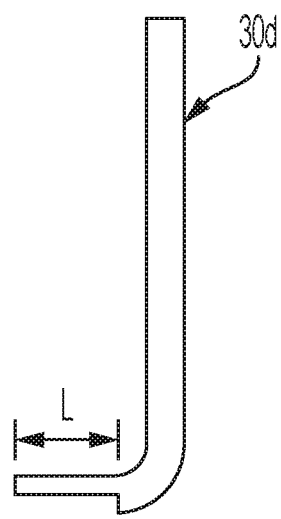

In this procedure, selection of appropriate flexible cannulas of increasing diameters is based on the alignment of the guide wires on the vertebral bony elements. In particular, a distance "L" between the guide wires establishes a corresponding length "L" of the straight distal portions of the flexible cannulas 30 (only one of which is shown in FIG. 7A) and the notched flexible cannula 30d shown in FIG. 7B.

Figure 8:
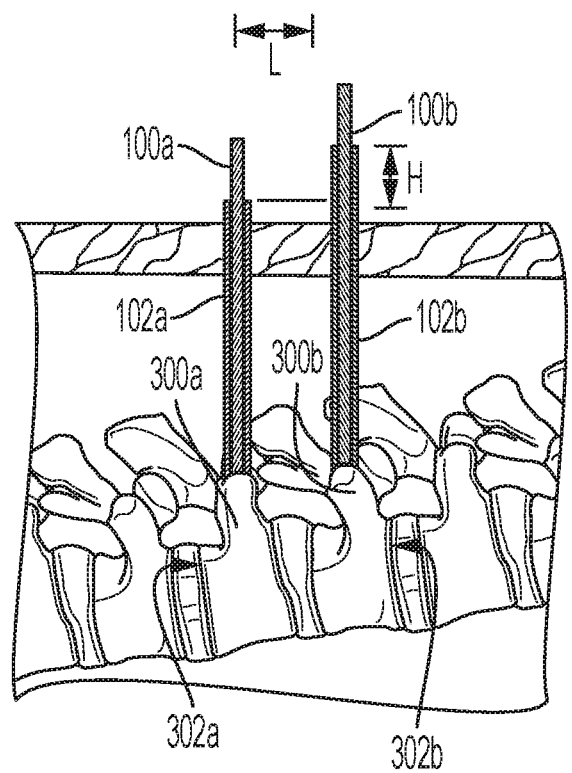
FIG. 8 is a side view of an initial step of another spinal fusion surgical procedure using instruments of a surgical instrument kit according to another exemplary embodiment of the subject disclosure.
Figure 9A:
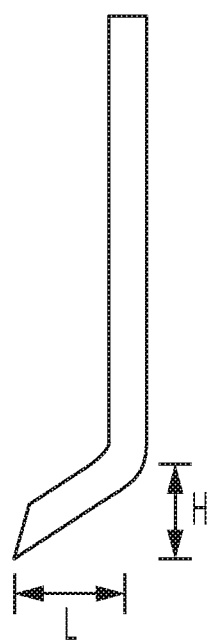
FIGS. 9A and 9B show flexible cannulas suitable for use after the initial step of the spinal fusion surgical procedure of FIG. 8.
Figure 9B:
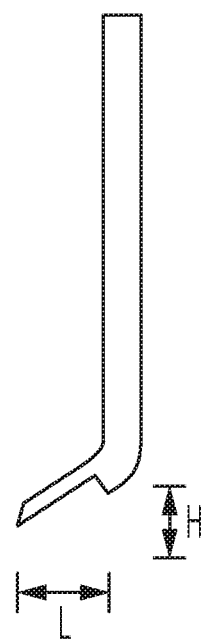

The surgical procedure shown in FIG. 8 is similar to that shown in FIG. 6. The primary difference is that the distal ends of guide wires 100a, 100b are not at substantially the same depth. That is, the distal end of the guide wire 100a is disposed a greater depth than the distal end of the guide wire 100b due to the difference in elevation "H" of the tops of the adjacent bony elements 300a, 300b. Accordingly, the distal ends of the straight distal portions of the flexible cannulas 30 (only one of which is shown in FIG. 9A) and the notched flexible cannula 30d are selected such that they are downwardly directed relative to their curved portions a corresponding elevation "H". As such, they are able to maintain the downward slope of the bony element 300a relative to bony element 300b.

According to a further embodiment, another surgical procedure according to the subject disclosure is provided. According to this exemplary embodiment, a directable guide wire having a curved tip arises from a cannulated needle placed on a vertebral bony element of, for example, the L5 vertebrae. The curved guide wire is then rotated to move the curved tip superior/inferior/medial/lateral based on where a bony element of an adjacent vertebrae, e.g., the L4 vertebrae, appears on fluoroscopic images. Once the tip of the curved guide wire is positioned on the bony element of the adjacent vertebrae, increasingly larger diameter flexible cannulas are placed over the guide wire, the guide wire is then removed, the bony elements can be decorticated and the bone graft delivery system bag placed at the grafting site in a manner similar to FIGS. 3B-3T. This procedure would not require a curved trocar and the guide wire may be provided with an expandable balloon to create a soft tissue pocket between the vertebral bony elements.

Another surgical procedure according to the subject disclosure includes the facet joint being grafted. According to this exemplary procedure, a surgical instrument kit is first obtained that includes a bovie tool, for example as disclosed in U.S. Pat. No. 10,064,675, the entire disclosure of which is hereby incorporated by reference, in addition to certain other elements common to the previously described surgical instrument kits. According to this procedure, a guide wire is first dropped into position on the facet joint of adjacent vertebrae and a 0.5 cm to 1.0 cm incision is made in the patient's skin. A series of increasingly larger diameter cannulas can be placed over the guide wire in order to dilate the soft tissue and minimize muscle injury. A bovie tool is dropped in the largest cannula and is used to bovie the facet joint. A rasp or burr is then used to decorticate the facet joint. A bone graft delivery system bag is then placed down the largest cannula and is packed with a bone tamp.

The surgical instrument kit of the subject disclosure results in several new and advantageous features relative to existing spinal fusion techniques. For example, trocars are specifically designed to closely approximate the trajectory between bony vertebral elements such as the transverse processes. There is also no large incision and associated dissection of bodily tissue. As a result, a bone graft and/or infusion may be placed at the posterolateral gutter without a large incision, and there is no large exposure of bony elements e.g., transverse processes during decortication.

Further, the subject surgical instrumentation kit has use in conjunction with other technology and clinical applications. For instance, the subject surgical instrument kit can be used in association with a Wiltse fusion technique with interspinous plates, as well as pedicle screws without interbody, cortical screws, and the like, in order to perform Wiltse fusion more quickly and less invasively. In addition, it can be used to back up Anterior Cervical Discectomy and Fusion (ACDF) and Anterior Lumbar Interbody Fusion (ALIF). That is, the methods of using the surgical instrument kit reduce concerns regarding pseudarthrosis as the exemplary embodiments result in a quick, minimally invasive manner to further add stability to the construct. The subject surgical instrument kit is also useful with Lateral Lumbar Interbody Fusion (LLIF) and provides increased stability. In particular, rather than using percutaneous screws, the surgical instrument kit and its methods of use create a percutaneous posterolateral fusion bed that can augment support of an interbody in place. Additionally, the surgical instrument kit is adaptable for use with interspinous plates, cortical screws and facet screws produced by surgical instrumentation manufacturers to augment fusion.

While described in connection with in-situ fusion of posterior aspects of the lumbar spine, it is to be understood that the instruments and system disclosed herein may find equal beneficial effect in fusing posterior aspects of the cervical and thoracic spines as well. Further, the percutaneous method disclosed herein may be used to augment bony healing for bone fractures (e.g., femur, humerus, tibia, etc.).

It will be appreciated by those skilled in the art that changes could be made to the exemplary embodiments described above without departing from the broad inventive concept thereof. It is to be understood, therefore, that this disclosure is not limited to the particular exemplary embodiments disclosed, but it is intended to cover modifications within the spirit and scope of the claims defined herein.

We claim:

1. A surgical instrument kit comprising:
   a curved trocar;
   a flexible cannula for positioning over the curved trocar;
   a flexible rasp device; and
   a bone graft delivery container containing bone graft material, wherein the bone graft delivery container is configured to be moved through the flexible cannula.

2. The surgical instrument kit of claim 1, comprising a plurality of curved trocars each having a differing radius of curvature.

3. The surgical instrument kit of claim 1, wherein the curved trocar includes a radius of curvature of about 2 mm to 1000 mm.

4. The surgical instrument kit of claim 1, wherein the curved trocar includes a radius of curvature of about 2 mm to 500 mm.

5. The surgical instrument kit of claim 1, wherein the curved trocar includes a straight proximal portion, a curved portion extending from the straight proximal portion, and a straight distal portion extending from the curved portion.

6. The surgical instrument kit of claim 5, wherein a longitudinal axis of the straight distal portion is disposed at an angle of about 80°-175° relative to a longitudinal axis of the straight proximal portion.

7. The surgical instrument kit of claim 5, wherein the straight proximal portion is about 10 mm to 150 mm in length.

8. The surgical instrument kit of claim 5, wherein the straight distal portion is about 10 mm to 50 mm in length.

9. The surgical instrument kit of claim 1, wherein the curved trocar has an overall diameter of about 2 mm and 10 mm.

10. The surgical instrument kit of claim 1, wherein the flexible cannula includes a straight proximal portion, a curved portion extending from the straight proximal portion, and a straight distal portion extending from the curved portion.

11. The surgical instrument kit of claim 10, wherein the straight distal portion of the flexible cannula includes a tapered tip.

12. The surgical instrument kit of claim 10, wherein the straight distal portion of the flexible cannula includes a notch.

13. The surgical instrument kit of claim 10, wherein a longitudinal axis of the straight distal portion of the flexible cannula is disposed at an angle of about 80°-175° relative to a longitudinal axis of the straight proximal portion.

14. The surgical instrument kit of claim 10, wherein the straight proximal portion of the flexible cannula is about 10 mm to 150 mm in length.

15. The surgical instrument kit of claim 10, wherein the straight distal portion of the flexible cannula is about 10 mm to 50 mm in length.

16. The surgical instrument kit of claim 1, comprising a plurality of flexible cannulas each having successively increasing outer diameters and successively decreasing lengths, respectively.

17. The surgical instrument kit of claim 16, wherein the plurality of flexible cannulas each have an overall diameter ranging from about 4 mm to 25 mm.

18. The surgical instrument kit of claim 16, wherein the plurality of flexible cannulas each have a wall thickness of about 1 mm to 2 mm.

19. The surgical instrument kit of claim 1, wherein the flexible rasp device comprises a flexible shaft connected to a rasp sized to pass through the flexible cannula.

20. The surgical instrument kit of claim 1, further comprising a cannula guide configured for insertion into the flexible cannula.

21. The surgical instrument kit of claim 20, further comprising a plurality of cannula guides each have successively increasing outer diameters.

22. The surgical instrument kit of claim 21, wherein each of the plurality of cannula guides have a straight proximal portion and a curved distal portion.

23. The surgical instrument kit of claim 1, further comprising a flexible plunger for moving the bone graft delivery container through the flexible cannula.

* * * * *